US009754300B2

(12) United States Patent
Kempton et al.

(10) Patent No.: US 9,754,300 B2
(45) Date of Patent: Sep. 5, 2017

(54) ELECTRIC VEHICLE STATION EQUIPMENT FOR GRID-INTEGRATED VEHICLES

(75) Inventors: Willett Kempton, Newark, DE (US); Fouad Kiamilev, Hockessin, DE (US); Rodney McGee, Georgetown, DE (US); Nick Waite, Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 12/887,013

(22) Filed: Sep. 21, 2010

(65) Prior Publication Data

US 2011/0202418 A1    Aug. 18, 2011

Related U.S. Application Data

(60) Provisional application No. 61/305,743, filed on Feb. 18, 2010.

(51) Int. Cl.
*G06Q 30/00* (2012.01)
*G06Q 30/06* (2012.01)
(Continued)

(52) U.S. Cl.
CPC ........ *G06Q 30/0601* (2013.01); *B60L 11/184* (2013.01); *B60L 11/1816* (2013.01);
(Continued)

(58) Field of Classification Search
CPC .............. B60L 11/1816; B60L 11/1842; B60L 11/1824; B60L 11/1844; G06Q 30/0601; G06Q 20/085; G06Q 20/22; G06Q 50/06
(Continued)

(56) References Cited

U.S. PATENT DOCUMENTS

| 4,770,841 A | 9/1988 | Haley |
| 5,499,181 A | 3/1996 | Smith |

(Continued)

FOREIGN PATENT DOCUMENTS

| CA | 2 697 015 | 1/2009 |
| CN | 1405944 A | 3/2003 |

(Continued)

OTHER PUBLICATIONS

"Using fleets of electric-drive vehicles for grid support," by Jasna Tomic and Willet Kempton, Journal of Power Sources 168 (2007) 459-468.*

(Continued)

*Primary Examiner* — Anne Georgalas
(74) *Attorney, Agent, or Firm* — RatnerPrestia

(57) ABSTRACT

Methods, systems, and apparatus transferring power between the grid and an electric vehicle are disclosed. The apparatus may include at least one vehicle communication port for interfacing with electric vehicle equipment (EVE) and a processor coupled to the at least one vehicle communication port to establish communication with the EVE, receive EVE attributes from the EVE, and transmit electric vehicle station equipment (EVSE) attributes to the EVE. Power may be transferred between the grid and the electric vehicle by maintaining EVSE attributes, establishing communication with the EVE, and transmitting the EVSE maintained attributes to the EVE.

23 Claims, 12 Drawing Sheets

(51) Int. Cl.
  *G06Q 20/22* (2012.01)
  *G06Q 50/06* (2012.01)
  *G06Q 20/08* (2012.01)
  *B60L 11/18* (2006.01)
  *H02J 3/38* (2006.01)

(52) U.S. Cl.
  CPC ....... *B60L 11/1824* (2013.01); *B60L 11/1842* (2013.01); *B60L 11/1844* (2013.01); *B60L 11/1846* (2013.01); *B60L 11/1848* (2013.01); *G06Q 20/085* (2013.01); *G06Q 20/22* (2013.01); *G06Q 50/06* (2013.01); *H02J 3/38* (2013.01); *B60L 2240/72* (2013.01); *B60L 2260/56* (2013.01); *B60L 2270/32* (2013.01); *Y02E 60/721* (2013.01); *Y02T 10/7005* (2013.01); *Y02T 10/7072* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y04S 50/10* (2013.01); *Y10S 903/93* (2013.01)

(58) Field of Classification Search
  USPC ...................................... 705/26.1, 27.1, 412
  See application file for complete search history.

(56) References Cited

U.S. PATENT DOCUMENTS

| | | | |
|---|---|---|---|
| 5,572,109 A | 11/1996 | Keith | |
| 5,583,418 A | 12/1996 | Honda | |
| 5,598,084 A | 1/1997 | Keith | |
| 5,767,584 A | 6/1998 | Gore et al. | |
| 6,028,537 A | 2/2000 | Suman et al. | |
| 6,087,806 A | 7/2000 | Fujioka | |
| 6,107,691 A | 8/2000 | Gore et al. | |
| 6,356,877 B1 | 3/2002 | Schulden | |
| 6,614,204 B2* | 9/2003 | Pellegrino et al. | 320/109 |
| 6,925,361 B1 | 8/2005 | Sinnock | |
| 7,013,205 B1 | 3/2006 | Hafner et al. | |
| 7,040,430 B2 | 5/2006 | Nomura | |
| 7,274,975 B2 | 9/2007 | Miller | |
| 7,550,861 B2 | 6/2009 | Oyobe | |
| 7,565,224 B2 | 7/2009 | Fairlie | |
| 7,582,979 B2 | 9/2009 | Oyobe | |
| 7,590,472 B2 | 9/2009 | Hakim et al. | |
| 7,612,466 B2 | 11/2009 | Skutt | |
| 7,740,092 B2 | 6/2010 | Bender | |
| 7,783,390 B2 | 8/2010 | Miller | |
| 7,792,613 B2 | 9/2010 | Kressner | |
| 2004/0110044 A1 | 6/2004 | McArthur | |
| 2006/0250902 A1 | 11/2006 | Bender et al. | |
| 2007/0068714 A1 | 3/2007 | Bender | |
| 2007/0271006 A1 | 11/2007 | Golden et al. | |
| 2007/0282495 A1* | 12/2007 | Kempton | B60L 8/00 701/22 |
| 2008/0167756 A1 | 7/2008 | Golden et al. | |
| 2008/0218104 A1 | 9/2008 | Lukic et al. | |
| 2008/0281663 A1 | 11/2008 | Hakim et al. | |
| 2009/0030712 A1 | 1/2009 | Bogolea et al. | |
| 2009/0062967 A1* | 3/2009 | Kressner et al. | 700/286 |
| 2009/0091291 A1 | 4/2009 | Woody et al. | |
| 2009/0189456 A1 | 7/2009 | Skutt | |
| 2009/0210357 A1 | 8/2009 | Pudar et al. | |
| 2009/0222143 A1 | 9/2009 | Kempton | |
| 2009/0224939 A1* | 9/2009 | Stocker | B60L 11/1842 340/870.02 |
| 2009/0228388 A1 | 9/2009 | Axelrod et al. | |
| 2009/0229900 A1 | 9/2009 | Hafner | |
| 2009/0259603 A1 | 10/2009 | Housh | |
| 2009/0313033 A1* | 12/2009 | Hafner | B60L 8/003 705/1.1 |
| 2009/0313103 A1* | 12/2009 | Ambrosio | B60L 8/00 705/14.25 |
| 2010/0017249 A1* | 1/2010 | Fincham et al. | 705/8 |
| 2010/0114798 A1* | 5/2010 | Sirton | B60L 11/1816 705/412 |
| 2010/0161393 A1* | 6/2010 | Littrell | 705/13 |
| 2010/0161481 A1* | 6/2010 | Littrell | B60L 3/12 705/40 |
| 2010/0211643 A1* | 8/2010 | Lowenthal | B60L 3/0069 709/206 |
| 2010/0274570 A1* | 10/2010 | Proefke | B60L 11/1824 705/1.1 |
| 2011/0099111 A1* | 4/2011 | Levy | G06Q 30/0207 705/63 |

FOREIGN PATENT DOCUMENTS

| | | |
|---|---|---|
| JP | 07-123599 | 5/1995 |
| JP | 2003-259696 A | 9/2003 |
| JP | 2005-341646 | 12/2005 |
| JP | 2006-279844 A | 10/2006 |
| JP | 2007-228695 A | 9/2007 |
| JP | 2007-252118 | 9/2007 |
| JP | 2007-259600 A | 10/2007 |
| JP | 2007-330083 | 12/2007 |
| JP | 2007-336778 | 12/2007 |
| JP | 2008-054439 | 3/2008 |
| JP | 2008-065635 | 3/2008 |
| JP | 2009-137456 A | 6/2009 |
| JP | 2009-183086 A | 8/2009 |
| JP | 2009-240150 A | 10/2009 |
| JP | 2009-254052 A | 10/2009 |
| JP | 2010-028913 | 2/2010 |
| JP | 2010-512727 A | 4/2010 |
| KR | 10-20090119832 | 11/2009 |
| WO | WO 2006/121761 | 11/2006 |
| WO | WO 2007/037972 | 4/2007 |
| WO | 2008073476 | 6/2008 |
| WO | WO 2008/073453 A1 | 6/2008 |
| WO | WO 2008/073476 A2 | 6/2008 |

OTHER PUBLICATIONS

SAE Electric Vehicle and Plug in Hybrid Electric Vehicle Conductive Charge Coupler, SAE Standard J1772TM Jan. 2010, Issued Oct. 1996, Revised Jan. 2010.

Kempton et al., "Vehicle-to-grid power implementation: From stabilizing the grid to supporting large-scale renewable energy," Journal of Power Sources, vol. 144, Issue 1, Jun. 1, 2005, pp. 280-294.

Kempton et al., "Vehicle-to-grid power fundamentals: Calculating capacity and net revenue," Journal of Power Sources, vol. 144, Issue 1, Jun. 1, 2005, pp. 268-279.

Kempton et al., "Vehicle-to-Grid Power: Battery, Hybrid, and Fuel Cell Vehicles as Resources for Distributed Electric Power in California," Prepared for: California Air Resources Board and the California Environmental Protection Agency (under contract #ARB00-612, "Feasibility of Electric Drive Vehicles as Distributed Power Generation Assets in California"), and Los Angeles Department of Water and Power, Electric Transportation Program.

Kempton et al., "Electric Vehicles as a New Power Source for Electric Utilities," 1997 Elsevier Science Ltd, Transpn Res.-D, vol. 2, No. 3, pp. 157-175, 1997. PII: S1361-9209(97)00001-1.

Guille et al., "A conceptual framework for the vehicle-to-grid (V2G) implementation," Elsevier, Energy Policy 37, Feb. 2009, pp. 4379-4390.

International Search Report for PCT/US2010/049819 filed Sep. 22, 2010, mailed Apr. 12, 2011.

Written Opinion for PCT/US2010/049819 filed Sep. 22, 2010, mailed Apr. 12, 2011.

International Search Report for PCT/US2010/049761 filed Sep. 22, 2010, mailed Apr. 11, 2011.

Written Opinion for PCT/US2010/049761 filed Sep. 22, 2010, mailed Apr. 11, 2011.

(56) References Cited

OTHER PUBLICATIONS

International Search Report for PCT/US2010/049756 filed Sep. 22, 2010, mailed Apr. 12, 2011.
Office Action mailed Sep. 18, 2012, for U.S. Appl. No. 12/887,038.
Notice of Reasons for Rejection issued in Japanese Patent Application No. 2012-553871 mailed May 20, 2014.
Notification of First Office Action issued in Chinese Patent Application No. 201080064330.7 dated Jun. 19, 2014.
Notification of First Office Action issued in Chinese Patent Application No. 201080066291.4 dated Jun. 19, 2014 (with English translation).
Notice of Reasons for Rejection issued in Japanese Patent Application No. 2012-553872 mailed Jul. 1, 2014 (with English translation).
Official Action issued in Japanese Patent Application No. 2012-553 dated Jul. 3, 2014.
Notification of First Office Action issued in Chinese Patent Application No. 201080066290.X dated Jul. 1, 2014.
Japanese Patent Office Notice of Reasons for Rejection issued in Japanese Application No. 2012-553871 mailed Jun. 9, 2015.
Notice of Reasons for Rejection issued in Japanese Patent Application No. 2012-553871 mailed Jun. 7, 2016.
Notification of the Fourth Office Action issued in Chinese Patent Application No. 201080064330.7 dated Jul. 6, 2016 (5 pages).
Notification of the Reasons for Rejection issued in Korean Patent Application No. 10-2012-7024278 dated Jul. 22, 2016 (11 pages).

\* cited by examiner

ELECTRIC VEHICLE STATION EQUIPMENT FOR GRID-INTEGRATED VEHICLES

CROSS REFERENCE TO RELATED APPLICATIONS

The present application claims priority to U.S. Patent Application No. 61/305,743 entitled Grid-Aware Electric Vehicle Supply Equipment and Vehicle link For Grid-Integrated Vehicle filed on Feb. 18, 2010, the contents of which are incorporated fully herein by reference.

The present application is related to U.S. Patent Application entitled Electric Vehicle Equipment For Grid-Integrated Vehicle (U.S. patent application Ser. No. 12/887,038; filed Sep. 21, 2010, now U.S. Pat. No. 8,509,976, which issued on Aug. 13, 2013) and U.S. Patent Application entitled Aggregation Server For Grid-Integrated Vehicles (U.S. patent application Ser. No. 12/887,064, filed Sep. 21, 2010, now U.S. Pat. No. 9,043,038, which issued on May 26, 2015), the contents of which are incorporated fully herein by reference.

The present application is additionally related to U.S. Patent Application Publication Nos. 2007/0282495 A1 and 2009/0222143 entitled "System and Method for Assessing Vehicle to Grid (V2G) Integration" and "Hierarchical Priority And Control Algorithms For The Grid-Integrated Vehicle," respectively, which are incorporated fully herein by reference.

STATEMENT REGARDING FEDERALLY SPONSORED RESEARCH

This invention was made with support by the Department of Energy (under funding number DOE DE-FC26-08NT01905). The U.S. Government may have rights in this invention.

BACKGROUND OF THE INVENTION

Conventionally, electric vehicles (e.g., battery powered vehicles and plug-in hybrid vehicles) are charged in a manner similar to those used to charge most rechargeable battery powered devices. That is, the operator plugs a charger for the vehicle's battery into an electrical outlet connected to a utility's electric power grid (the "grid") and the vehicle's charger immediately begins charging the vehicle's battery. The rate at which the vehicle's battery is charged is typically a result of the current limit imposed by the charger's electronics and the varying internal resistance of the vehicle's battery. A vehicle's charger may contain explicit logic or components to alter charge rate in order to prolong the life of the vehicle's battery. Typically, there are no additional components for charge rate control determined by other factors.

SUMMARY OF THE INVENTION

The present invention is embodied in methods, system, and apparatus to control power flow between electric vehicles and the grid.

An exemplary apparatus for transferring power between the grid and an electric vehicle includes at least one vehicle communication port for interfacing with electric vehicle equipment (EVE) and a processor coupled to the at least one vehicle communication port to establish communication with the EVE via the at least one communication port, receive EVE attributes from the EVE, and transmit electric vehicle station equipment (EVSE) attributes to the EVE.

An exemplary method for transferring power between the grid and an electric vehicle includes maintaining EVSE attributes, establishing communication with EVE, and transmitting the EVSE maintained attributes to the EVE.

An exemplary system for transferring power between the grid and an electric vehicle includes means for maintaining EVSE attributes, means for establishing communication with EVE, and means for transmitting the EVSE maintained attributes to the EVE.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. This emphasizes that according to common practice, the various features of the drawings are not drawn to scale. On the contrary, the dimensions of the various features are arbitrarily expanded or reduced for clarity. Included in the drawings are the following figures:

FIG. 2a is a block diagram illustrating exemplary electric vehicle equipment for vehicle to vehicle charging in accordance with aspects of the present invention;

DETAILED DESCRIPTION OF THE INVENTION

Figure 1:
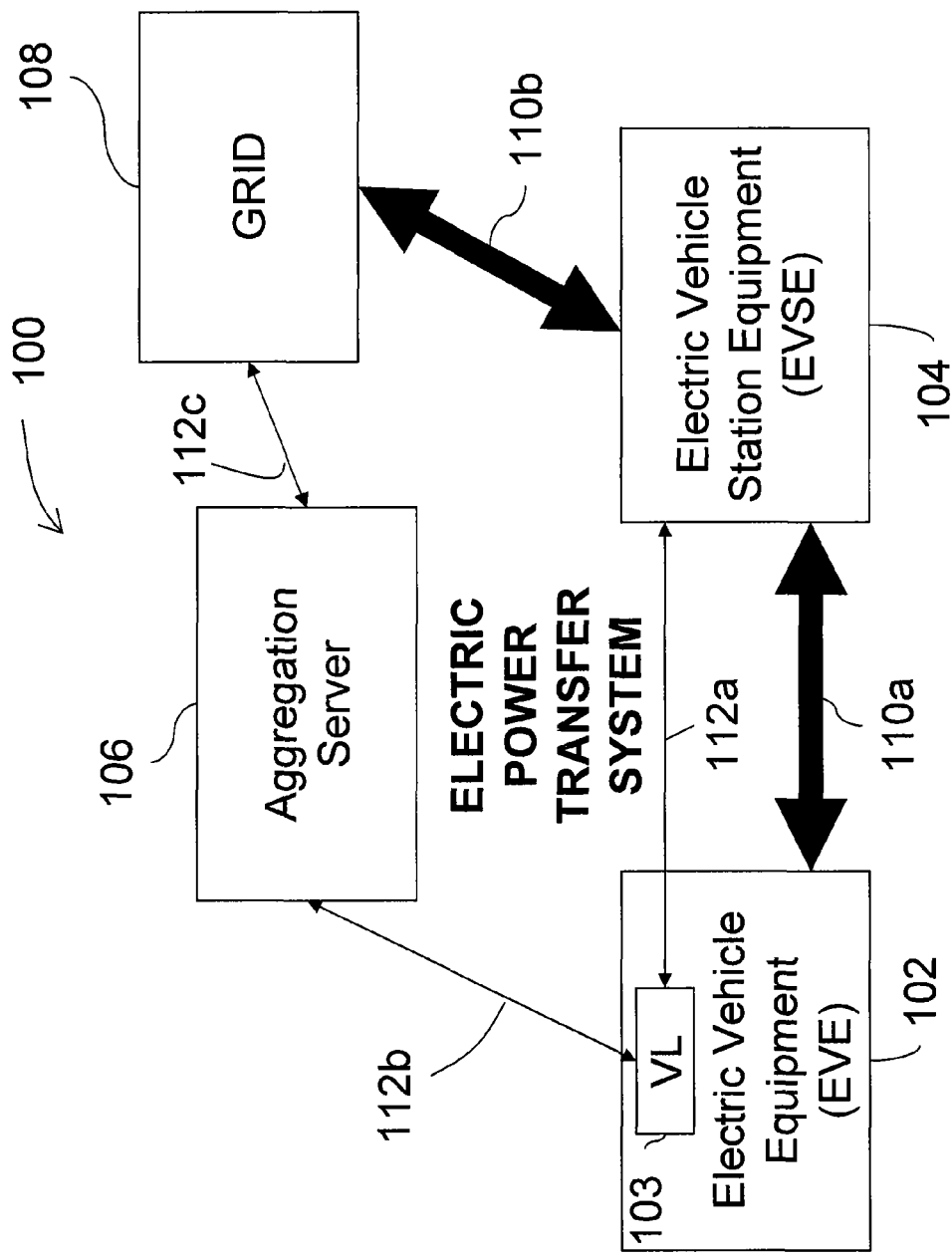
FIG. 1 is a block diagram illustrating an electric power transfer system including an aggregation server, electric vehicle equipment and electric vehicle station equipment in accordance with aspects of the present invention.

FIG. 1 depicts an electric power transfer system 100 in accordance with an exemplary embodiment of the present invention. The illustrated system 100 includes electric vehicle equipment (EVE) 102, electric vehicle station equipment (EVSE) 104, an aggregation server 106, and an electric grid 108. As a general overview, EVE 102 is positioned within a vehicle to link the vehicle to EVSE 104. EVE 102 includes a vehicle link (VL) 103 that provides a link from outside entities to components typically found in electric vehicles, which will be described in further detail below.

Electric power is allowed to flow between the grid 108 and EVE 102 of the vehicle through EVSE 104. An aggregation server 106 monitors grid power flow requirements and power flow between the grid 108 and multiple vehicles (each vehicle including EVE 102) and communicates with the grid 108 to allocate the vehicles' electric supply capacity and demand. Based on the determined capacity and demand, the electric power transfer system 100 enables, inter alia, vehicles to be charged during periods of time when there is low demand on the grid 108 and to supply power to the grid 108 during periods of time when there is high demand on the grid 108.

Thick connection lines 110 between EVE 102 and EVSE 104 (connection line 110a) and between EVSE 104 and the grid 108 (connection line 110b) represent electric power flow and thin connection lines 112 between VL 103 and EVSE 104 (connection line 112a), between VL 103 and the aggregation server 106 (connection line 112b), and between the aggregation server 106 and the grid 108 (connection line 112c) represent communication/data flow. Although not illustrated, other communication/data paths may be employed for establishing communication with other components. For example, VL 103 may communicate with aggregation server 106 indirectly via EVSE 104. In this example, the direct communication between VL 103 and the aggregation server 106 may be omitted and a direct communication path between EVSE 104 and aggregation server 106 would be added. Other communication strategies will be understood by one of skill in the art from the description herein.

Terminology used herein will now be defined.

The grid 108 refers to the electrical power system from generation to the electrical outlet. This includes generators, transmission and distribution lines, transformers, switchgear, and wiring at the "site" (e.g., a house, building, parking lot, and/or other parking location from the electric meter for that location through electrical panels to the electrical outlet). Sensors, computational logic, and communications may be located at one or multiple locations within the grid to monitor functions associated with the grid, and the vehicle's electrical system may satisfy one or multiple functions for the grid.

Grid-integrated vehicles generally refer to mobile machines for carrying passengers, cargo, or equipment. Grid-integrated vehicles have an "on-board" energy storage system (such as electrochemical, distillate petroleum products, hydrogen and/or other storage) and a grid connection system to recharge or supplement the on-board storage (e.g., a battery, capacitor or flywheel, electrolyzed hydrogen) with power from the grid 108. Grid-integrated vehicles may also be plugged into the grid 108 to provide power from the vehicle's on-board storage to the grid 108.

Electric vehicle equipment (EVE) 102 generally refers to equipment located in the grid-integrated vehicle to enable communication and power flow. In an exemplary embodiment, EVE 102 receives EVSE attributes (described below) and controls power flow and grid services to and from the grid-integrated vehicle based on, for example, EVSE attributes, the state of the vehicles on-board storage, expected driving requirements and driver desires. EVE 102 may include a vehicle link (VL) 103, also referred to as a vehicle smart link (VSL), that provides an interface between EVSE 104 and the grid-integrated vehicle's vehicle management system (VMS), which generally controls the electrical and electronic systems in the grid-integrated vehicle while not in use (e.g., while parked in a garage).

EVE attributes generally refer to information describing the grid-integrated vehicle that may be transmitted to EVSE 104 to which the vehicle is connected, the aggregation server 106, or to another grid-integrated vehicle. These may include: (1) a unique grid-integrated vehicle ID, (2) allowed billing and other commercial relationships, (3) authorizations of this vehicle, such as IEEE 949 certification for anti-islanding, and (4) technical capabilities of the vehicle, including maximum power output, whether it can produce power independently of grid power ("emergency power mode"), and others.

Electric vehicle station equipment (EVSE) 104 generally refers to equipment for interfacing EVE 102 with the grid 108. EVSE 104 may be located at, for example, a building or parking garage, near a street, or adjacent to a motor vehicle parking space. EVE 102 within a grid-integrated vehicle with on-board storage and power delivery and information connections may be connected to EVSE 104. EVSE 104 stores EVSE attributes and can transmit the attributes to EVE 102 of the grid-integrated vehicle or other devices.

EVSE attributes are information relating to EVSE such as its status, location, and other information. EVSE attributes generally refer to information related to EVSE 104 that is transmitted to EVE 102 of the grid-integrated vehicle. This may include: (1) characteristics of EVSE's physical capabilities; (2) legal and administrative allowances; (3) legal and administrative restrictions; (4) a unique EVSE ID; (5) allowed billing and other commercial relationships (which EVSE and grid-integrated vehicle participate in); (6) grid services that may be authorized (allowed) at this particular EVSE 104 location, and/or others.

Electric charging vendor generally refers to a management entity that manages EVSE 104. In one embodiment, an EVSE 104 may not have any electric charging vendor. For example, an EVSE 104 in a home garage, used to charge the home owner's vehicle from the same electricity supply used by other appliances in the home. In other embodiments, an electric charging vendor may have either real-time communication or delayed communication with EVSE 104, may provide real-time authorization for charging to a grid-integrated vehicle connected to the grid, and may require payment for charging.

Parking operator generally refers to a company or organization that controls a space where a vehicle may be parked, e.g., with one or more adjacent EVSE 104. The parking operator may charge for use of that space, require identification prior to parking, and/or may barter use of the space in exchange use of EVSE 104.

Aggregation server 106 refers to the software, hardware, and management procedures that communicate with grid-integrated vehicles from EVE 102 directly and/or via EVSE 104, issue requests to those vehicles for charging, discharging, and other grid functions, and offer grid services to a grid operator, distribution company, higher level aggregation server(s), generator, or other electric entity. The aggregation server 106 may also receive reports on grid services and charging from EVE 102 and/or EVSE 104. An aggregator is a business entity that manages the aggregation server 106. The aggregation server 106 may manage (control) power flow to/from grid-integrated vehicles connected to the grid 108 to aggregate and sell power to grid operators (e.g., Megawatts of power (MWs)). The aggregation server 106 may also manage information for other entities, including electric charging vendors, local distribution companies, and others.

Grid operators may include, for example: (1) a distribution system operator (DSO); (2) a transmission system operator (TSO) or an independent system operator (ISO); (3) a generator; (4) an independent power producer (IPP); and/or (5) a renewable energy operator.

Grid services generally refer to services provided between the grid-integrated vehicle and the grid 108, with power flowing through the EVSE 104. Grid services may include: (1) local building services, such as emergency power; (2) distribution system services such as: (i) providing reactive power, (ii) drawing off-peak consumption, (iii) balancing load on a three phase system, (iv) providing demand response, (v) providing distribution support (e.g., by deferring consumption or releasing energy when the distribution system is reaching a limit, or by using condition monitoring such as transformer temperature to reduce power through that transformer); and (3) transmission and generation system support such as: (i) providing frequency regulation, (ii) providing inter-hour adjustments, (iii) providing spinning reserves; and/or (4) renewable energy support such as (i) providing wind balancing, (ii) providing ramp rate reduction, (iii) providing a shift of energy from the solar peak to the load peak, (iv) absorbing wind or solar power when it exceeds load, among many others. For example, grid services may include charging at off-peak times, regulating the quality of grid power, producing power quickly and sufficiently to prevent grid failures or blackouts, and leveling generation from fluctuating renewable energy sources such as wind and solar sources.

Grid location generally refers to the electrical system location where EVSE 104 is connected. This may be a hierarchical location (e.g., electrical position) in the electric system, and may not correspond to a physical location. In an exemplary embodiment of the invention, grid location may be defined based on one or more of: (1) the building circuit to which EVSE 104 is connected and fused; (2) the service drop and meter to which EVSE 104 is connected; (3) the distribution transformer to which EVSE 104 is connected; (4) EVSE's distribution feeder; (4) EVSE's substation; (5) EVSE's transmission node; (6) EVSE's local distribution company; (7) EVSE's transmission system operator; (8) EVSE's subregion; and (9) EVSE's region, ISO or TSO. Due to distribution circuit switching (e.g., reconfiguration) intermediate positions in the hierarchical structure may dynamically change such that EVSE's grid location, for example, may dynamically move from one distribution feeder to another as distribution switches are opened and closed, even though the physical location of the EVSE does not change.

Figure 2:
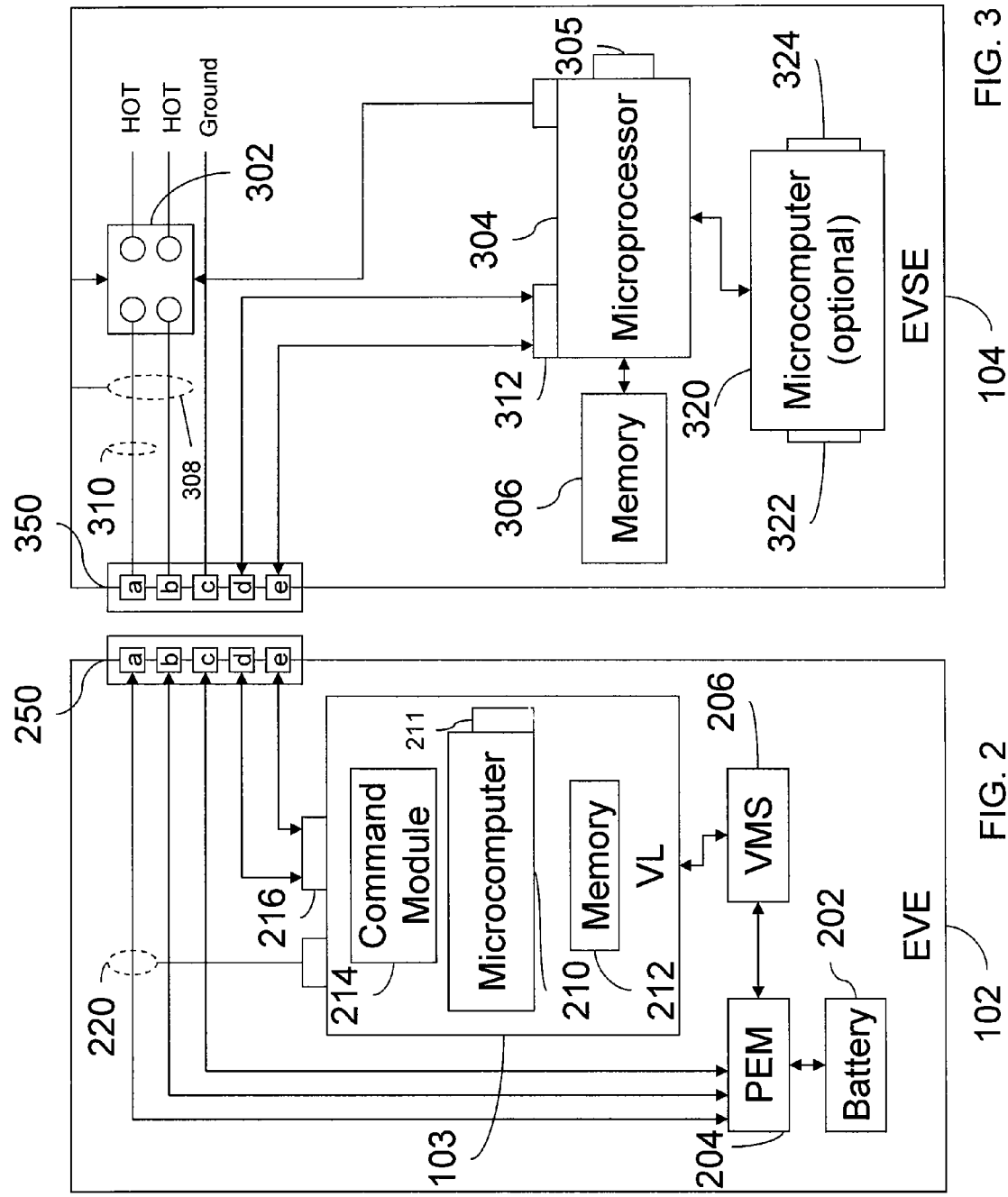
FIG. 2 is a block diagram illustrating exemplary electric vehicle equipment for use within the electric power transfer system of FIG. 1 in accordance with aspects of the present invention.
Figure 3:
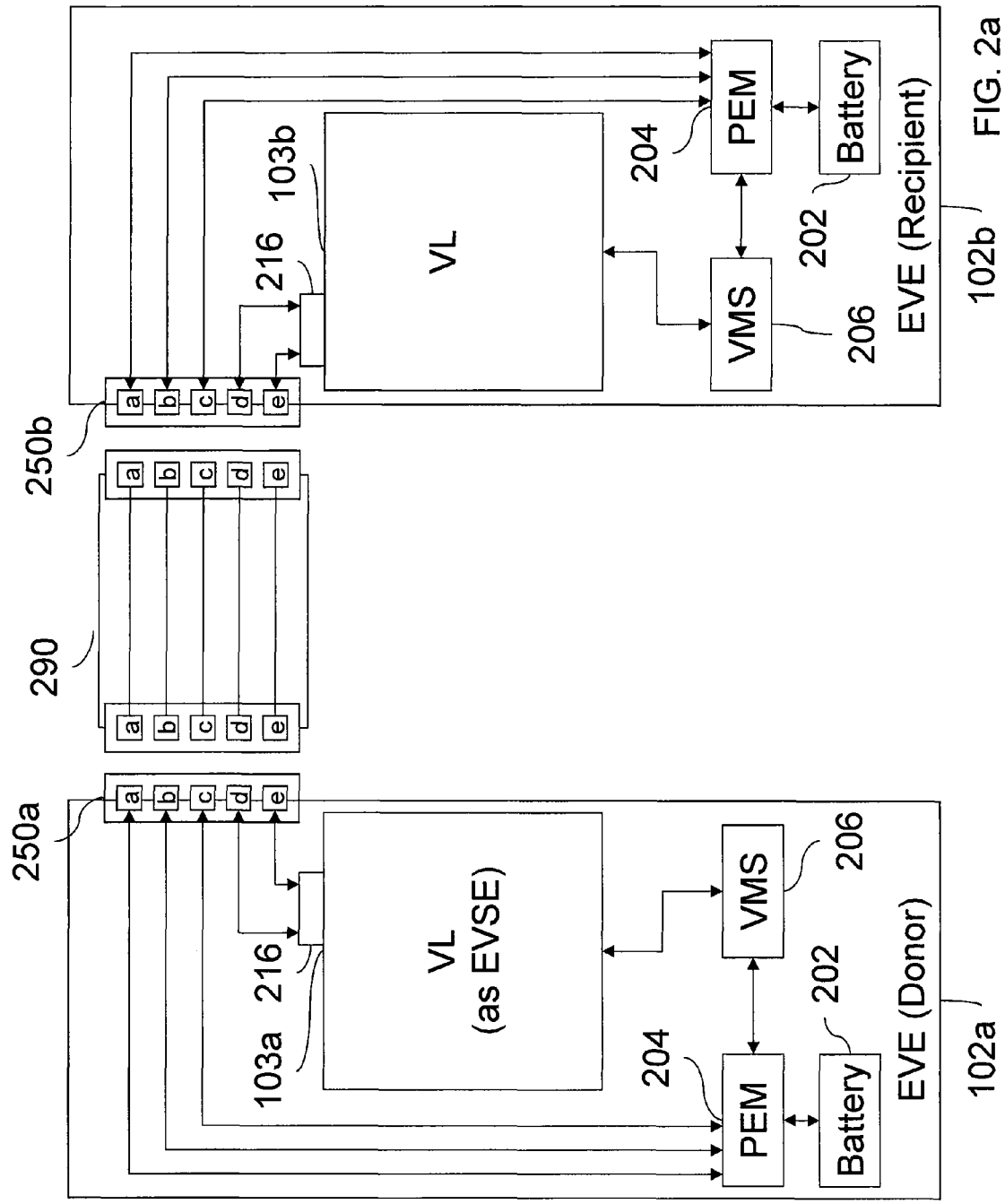
FIG. 3 is a block diagram illustrating exemplary electric station equipment for use within the electric power transfer system of FIG. 1 in accordance with aspects of the present invention.

FIG. 2 depicts exemplary EVE 102 for use in a grid-integrated vehicle and FIG. 3 depicts exemplary EVSE 104 to which EVE 102 may connect. EVE 102 includes a connector 250 and EVSE 104 includes a corresponding connector 350 for mating with connector 250. In various exemplary embodiments, there could be a cord attached to EVSE 104 with connector 350 on the end of the cord, or a separate cord could be provided to connect from EVSE connector 350 to EVE connector 250.

Referring to FIG. 2, EVE 102 includes VL 103, a battery 202, a power electronics module (PEM) 204, a vehicle management system (VMS) 206, and vehicle mating inlet 250. VL 103 includes a microcomputer 210, a memory 212, and a command module 214. VL 103 may be configured to communicate, determine provisions of grid services, control such provisions.

In an exemplary embodiment, PEM 204, VMS 206, and battery 202 are typical components found in a conventional electric vehicle and VL 103 is incorporated in accordance with the present invention to enable such a vehicle to receive/provide grid services. VMS 206 directly controls battery management, charging, and possibly driving functions under direction of VL 103, in addition to controls of VMS 206 by other vehicle controls. The functionality of VMS 206 may be integrated into other devices, such as the PEM 204, or may be performed by one or more devices.

VL 103 may be integrated into a grid-integrated vehicle during manufacture or added (retrofit) to a vehicle after manufacture. Although shown as a single device, VL 103 may be two or more devices in separate locations in a grid-integrated vehicle. In some exemplary embodiments, some functions of VL 103 may be provided by other devices and VL 103 may be constructed with only the additional functionality (not already provided in the other devices by the original automobile manufacturer). It may alternatively be a software system for performing functions implemented using existing vehicle computer(s), e.g., within VMS 206 and/or PEM 204. A suitable device that includes components that can be adapted to operate as the microcomputer 210, memory 212, and command module 214 in accordance with the present invention is Mini-ITX manufactured by Logic Supply of South Burlington, Vt.

Command module 214 controls PEM 204 directly (not shown) or via VMS 206 (and/or controls a separate battery management system) to charge, discharge, and/or provide reactive power, at varying power levels and varying power factors.

Microcomputer 210 is configured and programmed to provide the following functionality: (1) two-way communication with EVSE 104; (2) processing EVSE attributes received from EVSE 104; (3) executing instruction stored in memory 212: (a) to predicatively model the usage of EVE 102 and track interactions with the driver of grid-integrated vehicle; (b) to evaluate grid, battery and vehicle conditions, and (c) to determine whether and when to command EVE 102 to absorb or provide real power or reactive power. Microcomputer 210 may include a programming/communications port 211 for communication with a display, touch screen or programming device (not shown) for programming VL 103.

VL 103 stores grid-integrated vehicle attributes ("EVE attributes") in memory 212, and may transmit these attributes to EVSE memory 306 (described below with reference to FIG. 3) or to EVE memory 212 in another connected vehicle. Vehicle attributes include, for example: (1) a unique grid-integrated vehicle ID, (2) allowed billing and other commercial relationships such as valid account numbers or authorization codes for purchase of electricity and parking time, (3) authorizations and code compliance certifications of this vehicle, such as IEEE 949 certification for anti-islanding, and (4) technical capabilities of the vehicle, including maximum power output, whether it can produce power independently of grid power ("emergency power mode"), and others, (5) whether it is approved for dispatch by an aggregation server, (6) assurance (or not) of neutral when power is provided by vehicle, and (7) any accounts and authorizations to be credited for grid services. EVE attributes may be static such as unique vehicle ID or dynamic such as the state of charge of the battery, or whether or not the grid-integrated vehicle is currently serving as a local aggregation server for other local connected vehicles.

VL 103 may control charging and discharging of battery 202 via VMS 206 and/or may control provision of other grid services. More particularly, VL 103 may: (1) communicate, for example, with a wall-mounted or curb-mounted EVSE 104; (2) receive EVSE attributes from EVSE 104; (3) evaluate EVSE attributes to setup and control charging of the battery, payment for electricity, or other grid services, (4) receive information from the battery 202, PEM 204, VMS 206, onboard current sensor 220, dashboard settings, and other vehicle systems, either via the VMS 206 or via other on-board vehicle communications such as CAN-bus, or directly through driver input, or via other vehicle communications or inputs; (5) send commands regarding charging, discharging, reactive power, and other grid-related electrical power to the vehicle; and (6) send commands to other vehicle systems regarding heating or cooling of the passenger compartment, of the batteries, and any other actions by other vehicle systems.

Referring to FIG. 3, EVSE 104 includes a contactor 302, a microprocessor 304, a memory 306, a ground fault interrupt (GFI) sensor 308, a current measuring sensor 310, and vehicle mating connector 350. Memory 306 may be incorporated into microprocessor 304 or maintained as a separate component. Optionally, EVSE 104 may include a microcomputer 320, router, or other device for processing packet-switched signals, communicating to external networks, and running programs, with WAN or router connection 322 and local condition detection sensor connections 324. Suitable contactors, microprocessors, memory, GFI processing, and sensors will be understood by one of sill in the art from the description herein.

EVSE 104 may be configured for deployment at a garage, public parking space, curb, or other location for automobile parking. EVSE 104 may provide: (1) an electrical connection from a grid-integrated vehicle EVE 102 to the power grid 108; (2) EVSE attributes, and (3) a mechanism for billing/crediting grid services.

EVSE 104 maintains attributes associated with EVSE 104 such as its status, grid location, and other information for used by grid-integrated vehicle via VL 103 to control power flow and to provide valuable grid services. In an exemplary embodiment, microprocessor 304 stores EVSE attributes in memory 306 and selectively retrieves EVSE attributes from memory 306 for delivery to VL 103. EVSE attributes may include static and dynamic attributes. The static attributes may include: grid location information; charging business model such as provisions for payment or credit for electric energy and electric services, compensation for occupying the physical parking space, and other information; unique EVSE identification (ID); forward flow limit; reverse flow limit; emergency power flag; and/or authorized CAN bus code. The dynamic attributes may include disconnect status, grid power status, vehicle identifier, transformer overload, circuit switch open/closed, building loads, account authorizations, vehicle capabilities, and vehicle authorizations.

Microprocessor 304 includes a programming/communication port 305, for example, for downloading static information during installation of EVSE 104, regarding the building, electrical, circuit, safety authorizations, distribution company, meter account, and other information. Some of this information may be authorized only by DSO electricians or electrical inspectors. The static information may include: (1) grid location information indicating the location of EVSE 104 within the grid network; (2) a charging business model indicating whether charging of a vehicle is free, is to be charged, or other options described above; (3) a unique EVSE ID; (4) whether the internet connection from the building or EVSE location has a fixed IP address and if so, what is the IP number, or a dynamic IP assigned by DHCP or other internet protocol; (5) a forward flow limit indicating the maximum allowable flow of power into EVE 102 of a grid-integrated vehicle from EVSE 104; (6) a reverse flow limit indicating the maximum allowable flow of power into EVSE 104 from EVE 102 of a grid-integrated vehicle; (7) an emergency power flag indicating if emergency power may be supplied by EVE 102 of a grid-integrated vehicle 204 to EVSE 104 (the static information setting of the emergency power flag may require an inspector to verify that an isolation switch has been installed at the location); (8) an authorized CAN-bus flag indicating whether a CAN-bus protocol may be extended to EVSE 104.

CAN-bus connection may be authorized from EVSE 104 through the vehicle CAN-bus (if appropriate). EVSE 104 may be authorized to have full access to the vehicle CAN-bus based on EVSE serial number or model number with or without an encrypted key. If this authorization is not approved by EVE 102 of a grid-integrated vehicle, the grid-integrated vehicle may provide an isolated CAN-bus communication only between EVSE 104 and VL 103 and not to the entire vehicle CAN-bus.

EVSE microprocessor 304 or optional EVSE microcomputer 320 may receive dynamic information, for example via port 322 regarding: (1) the current status of a disconnect switch servicing EVSE 104 (e.g., whether currently connected or disconnected); (2) whether the grid is currently powered on; and (3) the vehicle identifier of the connected grid-integrated vehicle. This dynamic information may be transmitted from different grid equipment/sensors. For example, EVSE 104 may include a voltage sensor to monitor whether the grid is powered on. A signal from the disconnect switch may be used to monitor its state (e.g., opened or closed). VL 103 may supply the vehicle identifier to memory 306 via pins 250d/350d, input/output communication port 312 and microprocessor 304. Dynamic information may be repeatedly transmitted at predetermined intervals (e.g., every second to once a minute).

In certain exemplary embodiments, EVSE attributes stored in memory 306 may include additional information used for control of grid services. For example, memory 306 may store: (1) a unique serial number for EVSE 104; (2) a building electric meter serial number; and/or (3) a building account.

In various exemplary embodiments, the emergency power flag may indicate that emergency power: (1) may never be authorized; (2) may always be authorized; or (3) may be authorized based on certain conditions such as if EVE 102 of the grid-integrated vehicle is IEEE 929 compliant. EVSE 104 may include at least one contactor and a transformer (not shown) to match EVE power production to building loads when activated by the EVSE for emergency power produced by the EVE.

In certain exemplary embodiments, the forward and reverse flow limits may be a dynamic rating supplied by building sensors, smart grid elements such as transformer overcurrent detectors, or by the DSO via the microprocessor 320. In such cases, the dynamic rating may override any static information stored in memory 306 and may also override the single maximum amperes signaled by a SAE J1772 control pilot. Dynamic information from the DSO 230 could be part of active DSO repair strategies and management procedures, for example, limiting or increasing power consistently with circuit loadings, backfeeding for relief of circuit overload, or provision of emergency power at times consistent with opening, closing, and repair of distribution lines.

A single contactor 302, designed for single-phase, is shown in EVSE. One of skill in the art will see how this design is adapted to a simple three-phase system by adding additional poles to the contactor 302 and additional wires. Also, it is contemplated that additional contactors may be used, or a contactor with additional poles or throws may be used, such that the grid-integrated vehicle may be connected between any phases of a multi-phase grid system. In such an arrangement, a DSO may provide information stored in memory 306 to indicate phase connections. Such information may be periodically updated by the DSO to EVSE 104 using programming/communications port 305.

In some exemplary embodiments, EVSE 104 may control the dispatch of power without any authorization from the electric charging vendor or aggregation server 106.

In some exemplary embodiments, a billing mechanism may be provided such that billing is charged or credited to a financial account for grid services and for parking and may be tabulated at time of departure and billed to that account with no separate charges. Alternatively, there may not be a billing mechanism if the grid-integrated vehicle is providing grid service (parking and grid services may be offset against each other) or free charging is allowed (such as at the vehicle owners' own residence).

In other exemplary embodiments, EVE 102 of a grid-integrated vehicle may provide a valid account number in order to be energized. If a valid account number is not provided, EVSE will not energize and/or a parking violation may be incurred. In such cases, a card reader or bill and coin reader may be included at EVSE to authorize payment or credit to a financial account or for prepayment. Electric charging vendor authorization may be required for credit accounts. When prepayment is exhausted, EVSE 104 may de-energize and/or a parking violation indicator may be activated.

In various exemplary embodiments, a building electrical inspector, representative of the load-serving entity, or other authorized party may install EVSE 104 and setup EVSE attributes via port 305 including:

1. In certain exemplary embodiments, default settings of EVSE 104 may be configured to authorize charging of grid-integrated vehicle with EVE 102 at low current upon connection (e.g., the plug present signal confirmations that grid-integrated vehicle is connected to EVSE 104), even if no authorized EVSE 104 setup has been entered.

2. The electrical inspector may check circuit wiring, breaker, and mains, and may enter EVSE attributes into microprocessor 304 via port 305 for storage in EVSE static memory 306, for maximum current draw according to building load conventions.

3. The electrical inspector may enter EVSE attributes into microprocessor 304 via port 305 for storage in EVSE static memory 306 indicating electrical location. The electrical location may include, e.g., EVSE sub-meter if present, a building circuit, a service drop pole number, a distribution transformer, a distribution feeder circuit, substation, load serving entity ID, locational marginal pricing node, and transmission system (TSO or ISO). The associations may be recorded on a medium in EVSE, and sent to the VL in the EVE along with other attributes. Additionally, these associations may at specified times be sent to the electric charging vendor (EVSE 104 maintainer or provider) and one or more aggregation servers 106. The electrical inspector or other field personnel recording and reporting the associations vouches for the accuracy of EVSE attributes and may be required to enter an employee ID or other code along with EVSE attributes, for validation.

4. A representative of the load-serving entity may inspect (determine) the size of the distribution transformer and building loads and may enter EVSE attributes into microprocessor 304 via port 305 for storage in EVSE static memory 306, for the attribute of reverse flow limit (e.g., grid-integrated vehicle to grid current limit). The reverse flow limit may be set at a different level than (and may be higher than) the forward flow limit. The reverse flow limit may be set to zero to indicate that supply of power to EVSE 104 from grid-integrated vehicle with EVE 102 is not allowed. The reverse flow authorization may be contingent on the vehicle type being certified as conforming to IEEE 929 anti-islanding.

5. A representative of the load-serving entity may inspect for presence of an approved isolation switch, or microgrid switching, and if approved, may set EVSE attribute for emergency power to "true" indicating that grid-integrated vehicle EVE 102 may supply power to the building when power outage at the building occurs, and when the isolation switch has been activated, isolating the building from the grid.

A tamper-resistant process may be used to set EVSE attributes via a portable field device connected via programming port 305. For example, items 2, 3, 4, and 5 above may be protected or authorized by an employee ID or password, so they cannot be changed except by an authorized person. Other information, such as the Internet protocol used, may be deliberately not protected, or may have a lower level of protection, so that they may be changed by a building occupant or building IT manager.

Some EVSE attributes relating to safety or authorization, for example, items 2, 3, 4, and 5, above, may be recorded in memory using a digital signature, and transmitted to the EVE 102 along with the digital signature. Thus, the EVE 102 and aggregation server 106 can confirm at time of plug-in that the data has been entered into the EVSE 104 by an authorized party. If the authorization is missing or the digital signature is not valid, the authorization decisions in described below with respect to FIGS. 6, 8 and 10 would yield "no".

EVE 102 may plug into EVSE 104 which may result in a two-way flow of information and a one or two-way flow of power.

Although EVSE 104 is shown as a stand alone (complete) device, it is contemplated that EVSE 104 components of this invention, such as the storage and sending of EVSE attributes, the digital signal on connector 250d, communication to WAN, and others, may be configured as an add-on device to be included as part of a SAE J1772 or other compliant electric vehicle supply equipment device by adding information and communication capabilities as described herein to such devices.

Referring to FIGS. 2 and 3, in an exemplary embodiment, connectors 250/350 comply with Society of Automobile Engineers (SAE) standard J1772, International Electrotechnical Commission (IEC) standard 62196-2, or other domestic or international standard to enable grid-integrated vehicle connections to the grid 108. The present invention builds upon the standards described in SAE J1772 as passed in 2010 and draft IEC 62196-2, which are described in this paragraph for reference and to distinguish the additional uses of these connectors in accordance with aspects of the present invention. The mating connectors 250/350 include a first mating connector 250 for EVE 102 and a second mating connector 350 for EVSE 104. The first mating connector 250, which may be referred to as an "inlet," includes five male mating pins/contacts 250a, 250b, 250c, 250d, and 250e. The second mating connector 350 includes corresponding female mating pins/contacts 350a, 350b, 350c, 350d and 350e, which are configured to mate with male mating pins 250a, 250b, 250c, 250d, and 250e, respectively. Additional power contacts for three phase and neutral in accordance with draft IEC 62196-2 may also be incorporated in the connectors 250/350. In use, EVSE 104 signals the amount of charging available to EVE 102 over a digital signal wire through mating pins 250d/350d, e.g., as described in SAE J1772. A conventional plug present switch (not shown) may be incorporated into pin 350e. EVSE 104 may signal EVE 102 that the connectors 250/350 are mated in response to the plug present pin 350e receiving pin 250e, e.g., as described in SAE J1772.

SAE J1772 and IEC 62196-2 specify that power provided over the pins in the contactor is in response to the pilot signal indicating a connection with the grid-integrated vehicle EVE 102. In accordance with aspects of this invention, power may be energized by contactor 302, and adds additional controls this contactor may carry out, specifically, ground-fault detection signal indicating no ground faults, current overload detection indicating that current drawn is not excessive, and account authorization signal indicating authorization for this grid-integrated vehicle EVE 102 to draw power from this EVSE 104. The contactor 302 may be a normally opened device such that unless each of the signals indicates that contactor 302 is to be closed, contactor 302 remains open to stop power flow between the grid and grid-integrated vehicle.

Although a single set of mating connectors 250/350 that include five contacts (pins or sockets) are illustrated, one skilled in the art will understand from the description herein that different numbers of such connections/contacts may be used. For example, seven connections can be used for three phase power: one for each phase, one neutral, one ground, and two for data. Or, connectors may be provided for power and signaling to allow DC charging rather than AC charging. The invention described herein may build upon the standards above described or may be part of mating connector variants with different numbers and conventions of connectors, power lines or signal lines.

Figure 4:
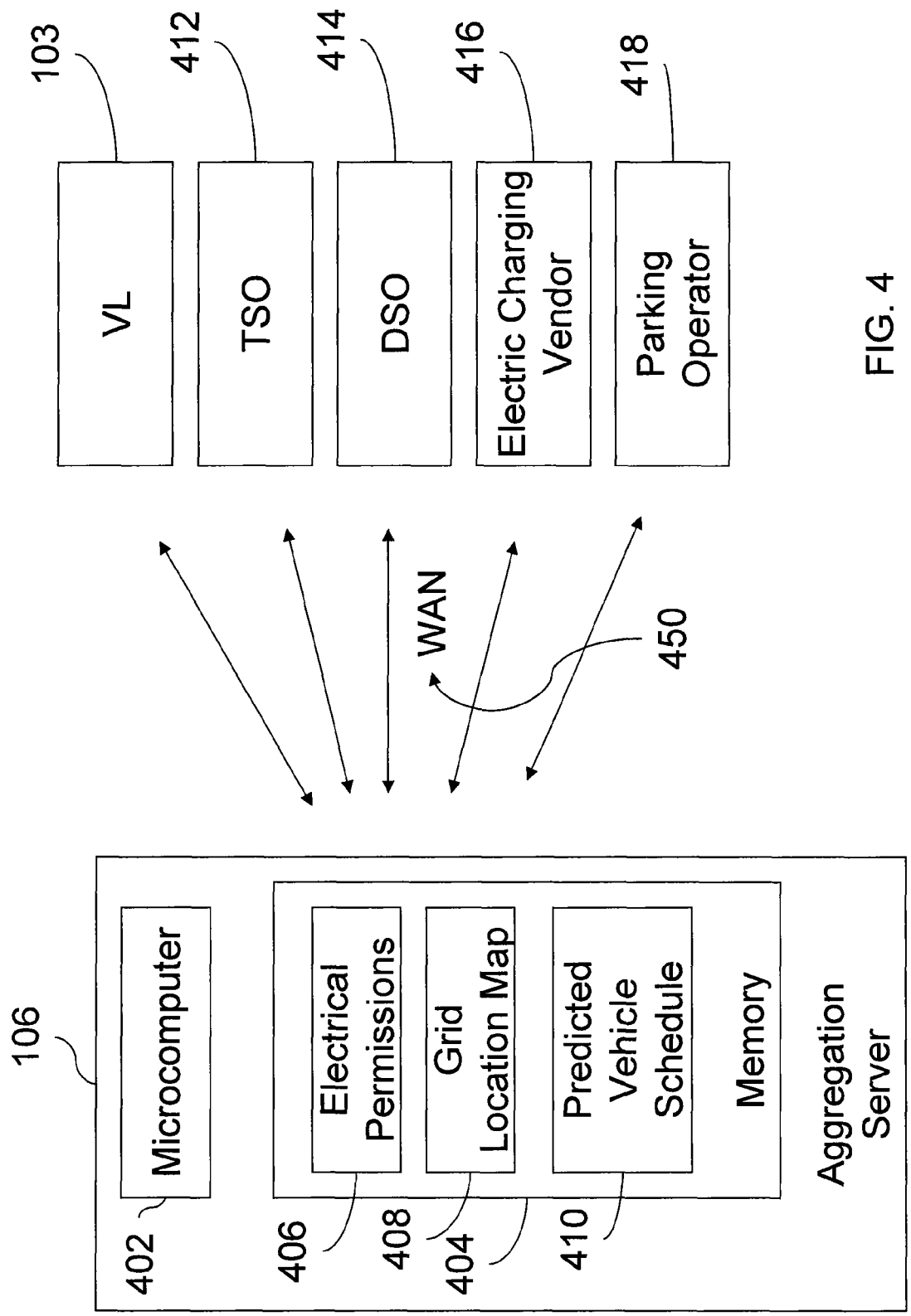
FIG. 4 is a block diagram illustrating communication between an exemplary aggregation server for use within the electric power transfer system of FIG. 1 and various entities in accordance with aspects of the present invention.

FIG. 4 depicts an exemplary aggregation server 106 and associated connections to other components for offering grid services. The illustrated aggregation server 106 includes a microcomputer 402 and memory 404 accessible by the microcomputer 402 for storage and retrieval of data. The aggregation server 106 additionally includes communication components (not shown) for establishing communication with VL 103 and optionally one or more of TSO 412, DSO 414, electric charging vendor 416, and parking operator 418. In an exemplary embodiment, communication with aggregation server 106 is via a Wide Area Network (WAN) 450. Suitable servers, microcomputers, memory, and communication components will be understood by one of skill in the art from the description herein.

When several EVSEs 104 are together in the space of a single parking operator or electric charging vendor (whether they are in a physical parking lot, a company, a municipality, or other entity), the parking operator or electric charging vendor may operate an aggregation server 106 itself, or may incorporate certain functions of the aggregation server into a local centralized control. In one exemplary embodiment, some functions of the aggregation server would be in a centralized pay station at a parking garage, and payment or receiving of credit could be made at the pay station rather than directly via VL 103 or EVSE 104.

Referring to FIGS. 1-4 generally, VL 103 may receive EVSE attributes by either: (1) VL 103 querying microprocessor 304 for EVSE attributes stored in memory 306 or (2) microprocessor 304 may determine that EVE 102 has been connected to EVSE 104, e.g., based on a pilot signal from EVE and microprocessor 304 may then broadcast EVSE attributes over one of the lines connected to EVE 102. In either case, EVE 102 attributes are transmitted to EVSE via a reciprocal process.

EVSE attributes may be communicated using a signal encoded by microprocessor 304, sent via input/output port 312, through mating contacts 250d and 350d of mating connectors 250/350 and input/output port 216 of VL 103. Alternatively, EVSE attributes may be sent by a powerline carrier signal through, for example, power contacts 250a and 350a. The received EVSE attributes are stored in memory 212 of VL 103. VL 103 may transmit an account, billing, accumulated kWh, and/or vehicle identifier to EVSE 104, aggregation server 106, an electric charging vendor, or parking operator for payment or credit account authorization.

VL 103 may communicate with EVSE 104 via one of: (1) powerline carrier (PLC); (2) CAN-bus, (3) serial communication over pilot line (150D/250D), and/or (4) negative-side signal on the pilot digital pulse width signal, among others. EVE 102 may include a cellular communication device (not shown) to provide a cellular signal as backup communication to aggregation server 106. Other communication techniques (not shown) such as low power radio, or low-frequency carrier over power lines to functioning VL 102s in other cars, may also be used.

VL 103 may communicate in real time or near real time with aggregation server 106. This communication may be through wire-connected WAN from VL 103 to EVSE 104, or EVE 102 may have a cellular or other wireless capability to communicate with the aggregation server 106. In the former case the connection is in effect only when EVE 102 is connected to an EVSE 104 with working LAN communications. The present invention may be adapted for implementation under all of these circumstances.

In an exemplary embodiment, VL 103 will attempt to communicate with the aggregation server 106 using each of the communication methods available, with direct connection through the connectors 250 and 350 tried first, other non-subscriber services next, and cellular next. If no communications to the aggregation server 106 are available, VL 103 enters autonomous mode, described below with reference to FIG. 7.

In an exemplary embodiment, VL 103 determines (keeps track of) the driver's prior trips, needs or stated desires for operation of grid-integrated vehicle and predicts a schedule of likely next trips (next trips predictions may include, for one or more future trips, the likely start time, the likely distance and required charge and the destination). The predictive model may be based on a prediction by EVE based on prior vehicle use, it may be based on explicit schedule information entered by the driver or fleet manager, or it may be based on a generic predictive model that improves itself with vehicle use and driver feedback. Driver input may be by controls on the vehicle, by a portable digital assistant, by a browser-based vehicle scheduling calendar, or by an extension or addition to other scheduling systems already in use by the vehicle drivers or fleet operator. Use of the vehicle is recorded by VL 103 and may be used as one data source for subsequent predictions. Driver input may be through on-vehicle controls connected to VL 103, may be through scheduling software hosted on the aggregation server 106 or data from another vehicle support platform, or may be through personal digital assistants or other wireless devices that communicate to VL 103, WAN, aggregation server 106, or other portals. Regardless of the means and channel of schedule data acquisition, the predicted schedule can be stored on both VL 103, e.g., in memory 212, and the aggregation server 106. Thus, EVE can use the next trips predictions, for example, to insure that the car is sufficiently charged when needed, e.g., for transportation and/or heating, determine most economical times to charge, etc. The aggregation server 106 can use the next trips predictions to plan the amount of electrical capacity to be offered for grid services, at what times, and at what location on the grid.

VL 103 and aggregation server 106 also have the capability of using the next trips predictions to provide additional services. For example, in extreme temperatures, the next predicted driving time may be used to preheat or pre-cool the passenger compartment so that it is at a comfortable temperature by the time of expected use. This temperature control may be performed by the vehicle heating/cooling system while on grid power, reducing energy draw from the vehicle battery for initial heating or cooling. Additionally, because heat and cool can often be stored in a lower-cost and smaller device than electrical storage, heat or cool may be stored in thermal storage in the vehicle based on the next trips prediction and current temperature or meteorological prediction of temperature at time of next trips prediction. Another use of the predictive model is to apply it in conjunction with battery temperature sensing in order to preheat or pre-cool the battery prior to driving, to improve operation and prolong life of the battery. The predictive model can also be used to provide other driver services. For example, since the next trip destination is known, a parking space or EVSE can be reserved at arrival time. Finally, if the trip is near or beyond the battery range of the vehicle, en-route recharging locations can be identified and suggested to the driver.

VL 103 and aggregation server 106 also use the next trips predictions to optimize battery charging for maximum battery life. Maximum battery life may be the primary goal of VL 103, or it may be one of several goals jointly optimized, for example, assuring sufficient charge for the next trip and the provision of grid services. Management for maximum battery life is based on the principle that the rate of charge, the state of charge (SOC), how long the battery stays at each SOC, temperature, and other factors greatly affect life of the battery. For example, a battery that usually stays between 40% and 60% of maximum SOC will last longer than a battery that is frequently charged to full. Conventional vehicle battery charging systems (prior art) limit the top and bottom SOC, for example, to between 10% and 90% of maximum SOC, however, they always charge to that maximum allowed SOC each time the vehicle is plugged in. Aspects of the present invention use the next trips prediction to determine the amount of charge needed and when to reach that. For example, taking the prior SOC numbers as an illustration, if the next trip is a short distance requiring only 20% of the battery, VL 103 and/or aggregation server 106 can charge the battery only to 60%, at the end of the trip the SOC would be expected to be 40%, as this would reliably meet the driving need while imposing very little wear on the battery. Alternatively, on an unusually long trip, EVE 103 may authorize charging to above the usual recommended amount, in this illustrative example, above 90%, but since the next trip time is known, the battery remains in that state only very briefly, i.e., right before the next predicted trip time, thus maximizing range while again minimizing wear to achieve that range.

Since both VL 103 and aggregation server 106 contain copies of the predictive schedule, these functions can be carried out by either one; the choice of which device controls can be optimized, for example, using the one that is connected at the time (aggregation server during driving if no cellular link) or the one most proximate and with most relevant local information (EVE during charging). In accordance with patent application publication no. 2009/0222143, this design also enables "graceful degradation," for example, charging to prepare for predicted trips can be performed by VL 103 even if communication to the aggregation server 106 and/or EVSE 104 fails.

When parked and connected, VL 103 and/or aggregation server 106 may control (make decisions about) the rate and timing of charging and provision of grid services. The driver may transfer information (e.g., an account number) to EVSE 104 or aggregation server 106 or to the electric charging vendor managing EVSE 104. This information may be pre-stored in EVE 102, or provided by a credit card or key fob swipe on EVSE 104 itself via an electronic or magnetic reader (not shown) or personal digital assistant (PDA). Once the information is validated by EVSE 104 or aggregation server 106 or electric charging vendor, EVSE 104 may receive authorization to energize contactor 302, for example to charge grid-integrated vehicle including EVE 102.

On behalf of the electric charging vendor, EVSE 104 may use the contactor 302 to refuse to charge until the driver or EVE 102 provide acceptable ID or account information for purchase of charging electricity. Also, on behalf of the parking operator, EVSE 104 may refuse to charge or may issue a warning (e.g. audible signal at EVSE or electronic signal transmitted to the parking operator) unless the driver or EVE provides acceptable account information for purchase of parking time. In an exemplary embodiment, the contactor 302 does not turn grid services on and off. Rather it acts as a fuse for emergency (e.g., GFCI for ground fault, plus overcurrent protection) and to prevent electricity theft (get ID before charging). More complex grid services and control of charge or discharge rate may be done by EVE 102.

VL 103 may include (or may access) an electric meter (e.g., a revenue-grade meter) to measure accumulated energy in each direction to and from EVSE 104. This meter may be integrated into EVE 102 based on current sensor 220, on the building (not shown), or in EVSE 104 based on current sensor 310. The revenue meter can be used to measure grid services or simply accumulated or net charging energy. VL 103 may include power management so that VL 103 may be switched on: (1) all of the time, (2) only when vehicle is plugged in, or (3) only when grid services are being required. VL 103 may be switched off after EVE 102 has been unplugged more than a threshold amount of time, or in some autonomous modes after the battery is charged to the desired level, to reduce battery drain when parked and disconnected for long periods of time. EVSE attributes, including EVSE ID, are used to determine whether charging, grid services, and other services are available at this location, and whether this vehicle shall pay for them and/or be paid. The vehicle ID may additionally be used by EVSE, e.g., along with account lookup via the electric charging vendor. For given EVSE charging attributes, the actions taken include:

1. EVSE attribute "unrestricted charging": Upon connection of a vehicle's EVE 102 to EVSE 104, signified by the pilot signal, the microprocessor 304 sends attributes to EVE 102 and closes the contactor 302 so that the vehicle can begin charging. No ID or account information, nor even acknowledgment of receiving attributes from the vehicle, is required. One exemplary instance of this "unrestricted charging" case is an unmodified SAE J1772 standard EVSE and vehicle, in which EVSE sends no attributes, and closes the contactor without any attribute information from the vehicle.
2. EVSE attribute "free charging for known occupants/workers/members." Upon connection of the vehicle's EVE 102 to EVSE 104, the microprocessor 304 sends EVSE attributes to EVE 102 and waits for vehicle ID. EVE 102 sends vehicle ID to EVSE 104. EVSE 104 looks up the vehicle ID and, if it is recognized by EVSE 104, EVSE 104 closes the contactor 302 and the vehicle can begin charging. In a variant, EVE 102 sends vehicle ID to EVSE 104, and EVSE 104 queries the electric charging vendor, to receive approval. EVSE 104 then closes the contactor 302 if approval is received.
3. EVSE attribute "charging for approved account holders." Upon connection, the microprocessor 304 sends EVSE attributes to EVE 102 and waits for an account number and possible additional codes or authorization. EVE 102 may send a code, such as an account code with digital signature, which is then processed by EVSE 104, e.g., by sending it for approval to the electric charging vendor. If EVSE 104 approves the code, it closes the contactor 302 and logs the time and amount of energy (kWh) used for charging. To perform this function, EVSE 104 uses a meter based on current sensor 310, voltage measurement and standard signal processing (not shown) in microcomputer 320, or, e.g., a separate revenue meter accessed by EVSE 104 via a secure communication. The vehicle account may not be billed, it may be billed for time, it may be billed for kWh, and/or it may be billed against credits. A variant of this is that the account is used to pay for the use of a parking space. If EVE 102 does not send an approved code, EVSE 104 does not close the contactor 302, and/or may indicate by a sound, light, or electronic signal, that parking in that location is not allowed.
4. EVSE attribute "Grid Services with V2G permitted here." Upon connection, EVSE microprocessor 304 sends EVSE attributes to EVE 102 and closes the contactor 302. VL 103 assesses EVSE attributes, passes grid location and electrical capacity to the aggregation server 106. VL 103 then compares the battery 202 state of charge with the predicted next trip time and distance, and any other driver parameters regarding minimum range requirements and driver preferences to optimize grid-integrated vehicle (GIV) revenue versus maximum range versus maximum battery life. Based on these considerations, VL 103 registers with the aggregation server 106 its ability to provide one or more grid services, each at zero or more capacity, for a specified period of time at this location. When EVE 102 is providing grid services, it may use an on-board meter that may be based on current loop 220 and other measurements and processing, or may be part of the PEM 204.
5. At any EVSE 104, regardless of whether or not EVSE 104 has any of the above capabilities, VL 103 may choose to, or may offer to, refund or credit the cost of charging to the entity paying for electricity at that EVSE. In order to refund or credit the cost of charging, VL 103 identifies the EVSE location, building meter account, or other identifier of the entity paying for electricity. The identification could be accomplished using EVSE attributes, in particular EVSE ID and/or the building meter number. An EVSE 104 without the ability to identify itself to VL 103, may be, for example an EVSE conforming to SAE J1772, or IEC 62196-2, but not having the additional capabilities described herein, or may be a simple electrical outlet with an adapter. For an EVSE without the ability to identify itself to EVE 102, EVE 102 may use additional means of identification. One method is an electronic "ping" with a distinct digital signature from a device inside the building, such as an X19 transmitter. In accordance with this embodiment, the transmitter may be placed in the building and it creates an electronic signature readable by VL 103 of all vehicles plugged in to any EVSE 104 or to any plug within the same distribution transformer. A second method for identifying the entity paying for electricity is to use GPS, in conjunction with a list of known charging locations stored in VL 103 or aggregation server 106. GPS is not precise enough for the reliability needed for safety-related services and authorizations such as backfeeding and emergency power, but may be sufficiently reliable for billing or crediting a revenue meter account for charging electricity.
6. Variants and combinations of the above will be apparent to one of skill in the art, based on the descriptions above.

VL 103 may include a vehicle-to-vehicle communication module (not shown) for communicating to other vehicles via a low power short-range radio, or via low frequency signals (e.g., 1 to 300 KHz) via powerline carrier (PLC) over the grid 108 or power wires. The signal frequency may be selected to be able to pass through one or more distribution transformers. Such communication may be useful for the following reasons: (1) so that multiple cars may provide grid services cooperatively, (2) in case of failure of the normal signal through EVSE, or (3) in order to increase bandwidth, a group of vehicles in local communication can signal to the aggregation server that only one internet signal may be needed to activate, and receive reports from, a cluster or local aggregation of locally-communicating vehicles.

When communicating directly with other vehicles, EVE 102 may function as an agent with authorized peers. Vehicle-to-vehicle communication may be used either to compensate for loss of direct communication to aggregation server 106, or to act on command from other nearby authorized vehicles to pool bandwidth for real-time dispatching and return reporting. For example, EVE 102 of one grid-integrated vehicle may be nominated to serve as a local coalition representative. The local coalition representative receives a communication from aggregation server 106, parses it into individual vehicle portions, broadcasts the corresponding commands to nearby or adjacent vehicles. In response, those nearby vehicles each independently respond to their command, then each sends a response to the local coalition representative, the local coalition representative adds or accumulates those response reports, and reports them as an combined total response to the aggregation server.

In certain exemplary embodiments, EVSE 104 may be approved by the OEM (automaker) for CAN-bus connectivity. In such embodiments, EVE 102 may include equipment to extend the digital connection of the CAN-bus in the grid-integrated vehicle EVE 102 to EVSE 104 via, for example, via mating contacts 250*d* and 350*d*. This extension may be contingent on authorization indicated by an "authorized CAN-bus" code in EVSE memory 306.

In certain exemplary embodiments in which three phase power is provided to the PEM 204, EVE 102 can provide load balancing across three phase power. For example, a PEM 204 may be capable of drawing from two phases. VL 103 can detect the highest voltage across any two phases, and have the PEM 204 switch to using power from those two phases. This may be accomplished with EVE 102 incorporating appropriate lags and consideration of the expected drop in voltage across the two phases from which the PEM 204 is drawing. In this embodiment, EVE 102 provides dynamic three-phase load balancing.

FIG. 2A depicts a vehicle-to-vehicle charging system. In accordance with an exemplary embodiment, VL 103*a* of a first vehicle (the "donor" vehicle) includes additional functionality to enable it to appear as an EVSE to VL 103*b* of a second vehicle (the "recipient" vehicle). A communication cable 290 including identical connectors on each end for attachment to connectors 250*a*, through 250*d* enables signal flow between the donor and recipient vehicles and power flow from the donor vehicle to the recipient vehicle.

Donor vehicle EVE 102*a* may include circuits to generate an ampere capacity signal as if it were an SAE J1772 compliant EVSE, or an IEC 62196-2 compliant EVSE, or similar. Donor vehicle EVE 102*a* may have circuits to detect recipient EVE 102*b* as an EVE to be charged. Additionally, EVE 102*a* in the donor vehicle may be capable of activating the PEM and battery in 120*a* so as to generate grid-like alternating-current power from the battery 202 direct-current power. EVE 102*a* or the communication cable 290 provides the passive signal for plug present. Thus, EVE 102*a* and communication cable 290 together appear to EVE 102*b* of the recipient vehicle as if it were an EVSE. This means that a vehicle with this functionality and communication cable can charge another vehicle without any connection to the electric grid. The recipient vehicle requires no additional functionality other than standard SAE J1772 or IEC 62196-2 compliance. Optionally, EVE 102*b* may have additional encoding/decoding equipment for communication not specified in SAE J1772 including one or more of: digital signaling on the negative side of a control pin, digital signaling on the negative side of a CAN-bus or single-wire Ethernet, and/or power line carrier Ethernet over the power wires to EVSE 104.

In an exemplary embodiment, no connection is made by either vehicle to earth during vehicle-to-vehicle charging. This reduces any risk of electrical potential (voltage difference) between earth ground and any hot, neutral, or chassis ground on the vehicles and reduces the need for GFI protection. In another exemplary embodiment, GFI protection may be added to the donor vehicle.

In another exemplary donor vehicle embodiment, EVE 102*a* may have a physical switch, software button, numeric input, or other input device (not shown), which allows the user to signal intent as to which vehicle is to be the donor, and also allows the user to set a numeric limit, for example in kWh, on the maximum energy transfer to be made.

Referring back to FIGS. 1-4, EVE 102 may have stored in its memory 212 vehicle attributes, including one or more of account numbers, utility meter accounts, authorization codes, vehicle identifiers, or other identifiers, any of which may be encrypted, in order to authorize power flow and/or financial transactions with EVSE 104, the electric charging vendor 310, the building owner or other local electric customer, the parking operator 311, or aggregation server. Additionally, EVE 102 may have vehicle dynamic attributes, including records of accumulated kWh energy in each direction, its logged provision of grid services, and the time it occupies a parking space, and my use these dynamic attributes in order to calculate payments or credits. EVE 102 may communicate to EVSE 104, the electric charging vendor 310, and aggregation server 300 for a financial transaction, bill, or invoice for energy and grid services. If EVE 102 is unable to communicate, for example, because the WAN 330 is disconnected at the time the credit or payment calculation is completed, the information may be stored in EVE and communicated later, when WAN connection 330 is restored. Payment or settlement may include goods and services such as kWh of charging energy, minutes of charging, time based or system-related billing components, such as "off peak rate" or "absorbing excess wind rate", non-electrical attributes, such as "green power", locally-controlled grid services, and non-electrical services, such as parking.

Figure 5:
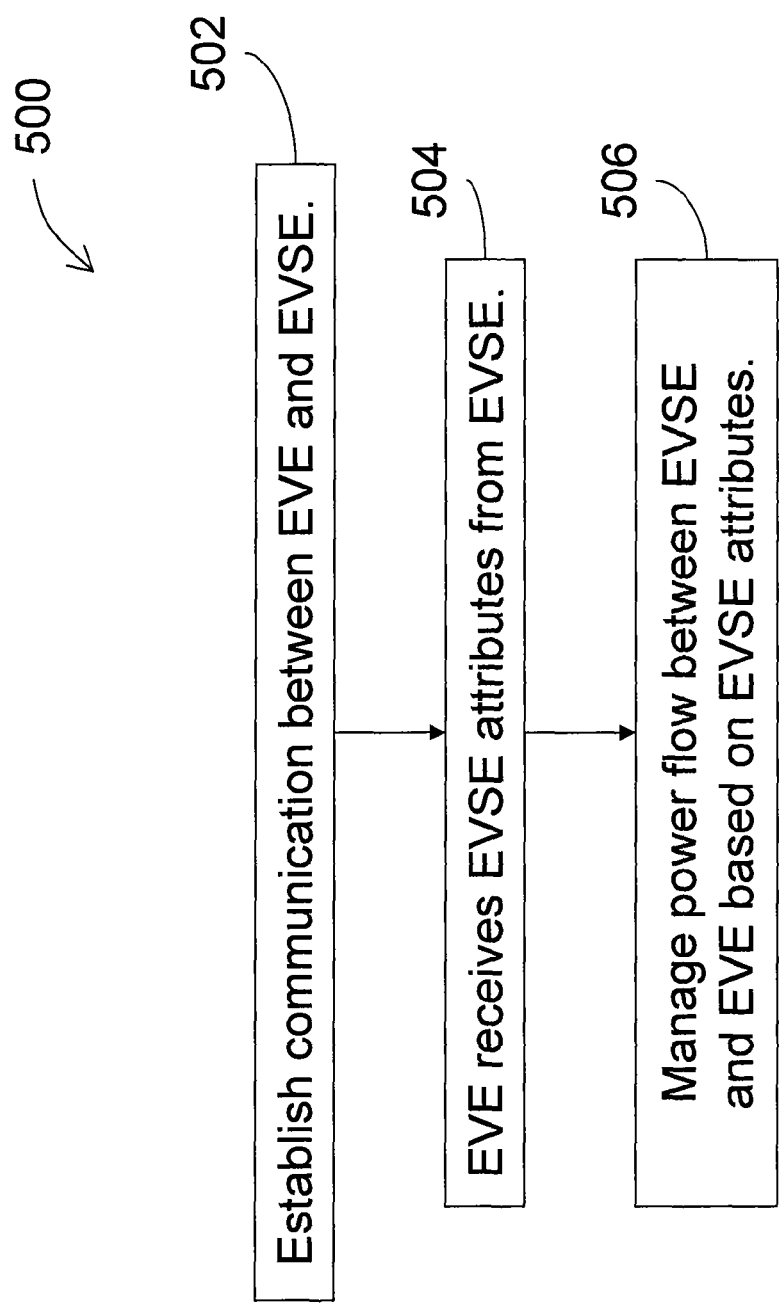
FIG. 5 is a flow chart depicting exemplary steps performed by electric vehicle equipment in accordance with exemplary aspects of the present invention.

FIG. 5 is a flow chart 500 of exemplary steps for managing power flow in accordance with embodiments of the present invention. To facilitate discussion, the steps of flow chart 500 are described with reference to EVE 102 and EVSE 104.

At step 502, EVE 102 establishes communication with EVSE 104. At step 504, EVE 102 receives EVSE attributes from EVSE 104. At step 506, EVE 102 manages power flow between EVE 102 and EVSE 104 based on EVSE attributes.

Figure 6:
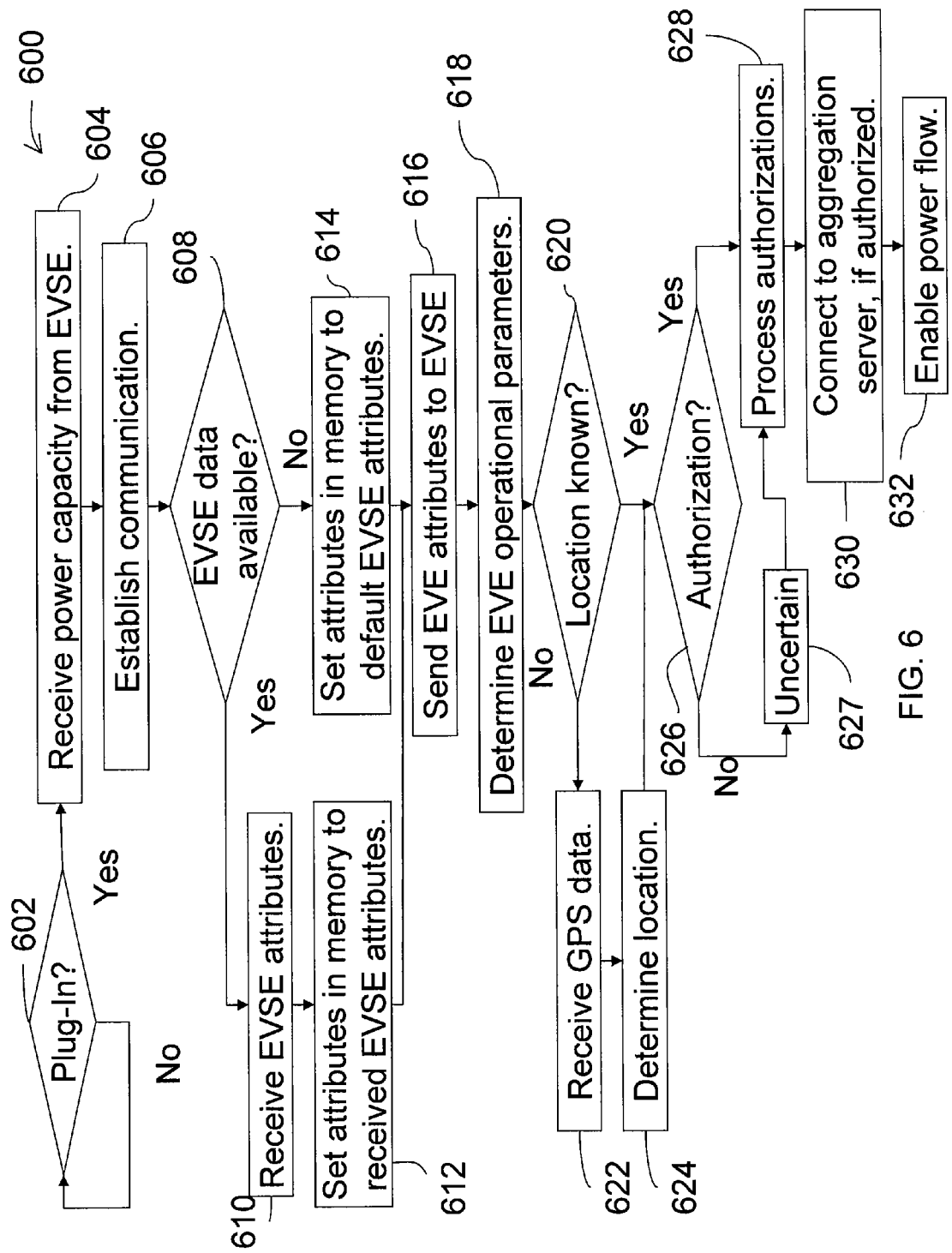
FIG. 6 is another flow chart depicting exemplary steps performed by electric vehicle equipment in accordance with exemplary aspects of the present invention.

FIG. 6 is a flow chart 600 of exemplary steps for interfacing with EVSE 104 to manage power flow from the perspective of EVE 102.

At step 602, EVE 102 detects a plug-in event. In an exemplary embodiment, EVE 102 detects the presence of an EVSE connector 350 by the corresponding connector 250 of EVE 102, e.g., based on a plug-present signal generated by pin 250*e*. If plug-in is detected, processing proceeds to step 604. Otherwise, EVE 102 continues to wait for a plug-in event.

At step 604, EVE 102 receives power capacity from EVSE 104. In an exemplary embodiment, EVSE 104 automatically transmits its plug capacity in a pilot signal to EVE 102, e.g., in accordance with SAE J1772 and/or IEC 62196-2, when EVSE 104 is plugged into EVE 102.

At step 606, EVE 102 establishes communication with EVSE 104. In an exemplary embodiment, communication is established in accordance with one of the methods described above.

At step 608, EVE 102 determines if EVSE attributes are available from EVSE 104. If EVSE attributes are available, processing proceeds to step 610. If EVSE attributes are not available, processing proceeds to step 614.

At step 610, EVE 102 receives EVSE attributes. In an exemplary embodiment, VL 103 receives EVSE attributes directly from EVSE 104 by one of the methods above, such as serial communication over the negative-side pilot signal, or powerline carrier. In an exemplary embodiment, EVSE attributes include grid location, charging business model, unique EVSE identification, dynamic forward flow limit, dynamic reverse flow limit, and emergency power flag.

At step 612, EVE 102 sets a local copy of attributes for the EVSE 104. In an exemplary embodiment, VL 103 copies the attributes received from the EVSE to a copy of those attributes in memory 212.

At step 614, which is reached if EVSE attributes are not available, EVE 102 sets a local copy of attributes for the EVSE to defaults. In an exemplary embodiment, VL 103 sets the defaults in local memory 212; defaults may include attributes to allow charging of vehicle, but not to allow backfeeding or emergency power from the vehicle.

At step 616, EVE 102 sends EVE attributes to the EVSE 104. In an exemplary embodiment, VL 103 sends the following exemplary attributes to EVSE 104: (1) a unique grid-integrated vehicle ID, (2) allowed billing and other commercial relationships such as valid account numbers or authorization codes for purchase of electricity and parking time, (3) code compliance of this vehicle, such as IEEE 949 certification for anti-islanding, and (4) technical capabilities of the vehicle, including maximum power output, whether it can produce power independently of grid power ("emergency power mode"), and others, (5) whether it is approved for dispatch by an aggregation server, (6) assurance (or not) of neutral when power is provided by vehicle, and (7) any accounts and authorizations to be credited for grid services.

At step 618, EVE 102 determines its operational parameters. In an exemplary embodiment, VL 103 determines operational parameters, which include charge and discharge power capacity, e.g., in kilowatts, based on EVSE power capacity, EVE power capacity, EVSE attributes, battery kWh and state of charge, and driving schedule. For example, one operational parameter, the charge and discharge power capacity, may be determined in part by the current energy level of the battery 110 ("battery energy") and the additional energy level needed to charge the battery 110 to full ("battery headway").

At step 620, EVE 102 determines if the location of the EVSE 104 is known. In an exemplary embodiment, VL 103 determines if location information is present in the EVSE attributes. If the location is know, processing proceeds at step 626. If the location is not known, processing proceeds at step 622.

At step 622, EVE 102 receives GPS data. In an exemplary embodiment, EVE 102 receives GPS location data from a conventional GPS receiver.

At step 624, EVE 102 determines the location of the EVSE 104. In an exemplary embodiment, VL 103 determines the location of the EVSE by comparing GPS data to known locations for EVSE 104 and identifies the known location nearest the GPS location data as the location of the EVSE 104. If the location has been inferred or based on GPS, EVE sets in memory 212 a flag that the location is "uncertain", that is, may be less reliable than if set by EVSE attributes.

At step 626, EVE 102 checks for authorizations. In an exemplary embodiment, VL 103 processes authorizations by checking for electric account or electric charge vendor information identified in attributes for the EVSE. If electric account or electric charge vendor information is available, processing proceeds at block 628. Otherwise, EVE 102 identifies the authorization as uncertain in step 627.

At step 628, EVE 102 processes authorizations. In an exemplary embodiment, if electric account or electric charge vendor information is available from the EVSE, VL 103 retrieves account and authorization information and processes the information for payment, if required. If account information was not provided but location is known or inferred, and a building electric account at the location is authorized, VL 103 may infer account information. In addition, VL 103 may determine if additional authorizations have been received, for example, to use an aggregation server other than its normal aggregation server, if it is allowed to backfeed, and if it is allowed to provide emergency power, e.g., based on attributes from the EVSE 104.

At step 630, EVE 102 will attempt to connect to an aggregation server 106, if authorized. In an exemplary embodiment, if EVSE 104 requires use of a local aggregation server and the vehicle user has authorized use of a substitute aggregation server, then VL 103 will attempt to connect to a local aggregation server. Otherwise, VL 103 will attempt to use the normal aggregation server for the vehicle.

At step 632, EVE 102 enables power flow. In an exemplary embodiment, VL 103 enables power flow by instructing PEM 204 through VMS 206.

Figure 7:
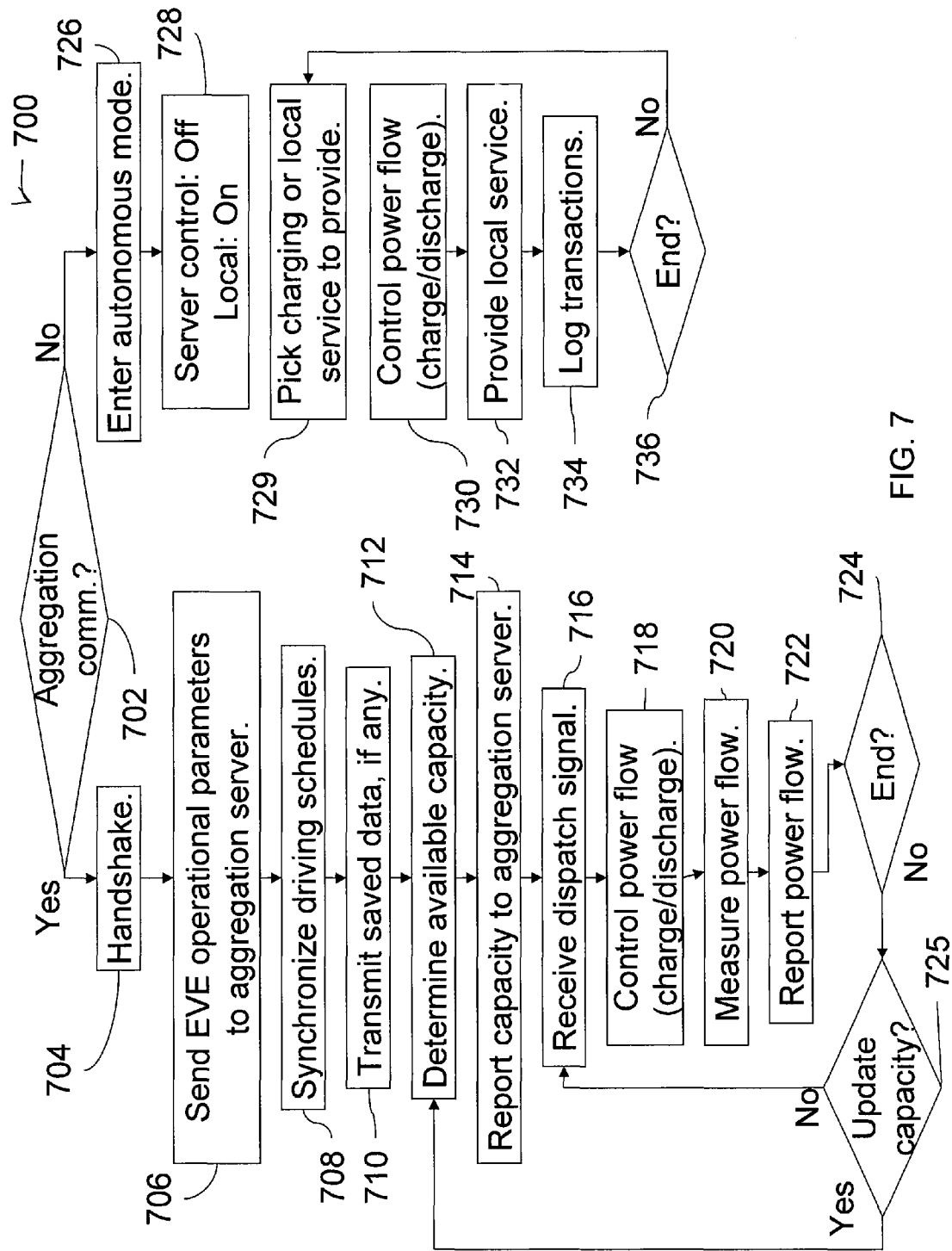
FIG. 7 is another flow chart depicting exemplary steps performed by electric vehicle equipment in accordance with an exemplary aspects of the present invention.

FIG. 7 is a flow chart 700 of exemplary steps for EVE 102 to interface with the aggregation server 106 if connection with the aggregation server 106 is established, or to operate autonomously if connection to the aggregation server is not established. In either case, flowchart 700 shows how to manage power flow from the perspective of EVE 102.

At step 702, EVE 102 determines if it is in communication with aggregation server 106. In an exemplary embodiment, VL 103 determines is there is communication with aggregation server 106. If there is communication with aggregation server 106, processing proceeds to step 704. If there is not communication with aggregation server 106, processing proceeds at step 726 with EVE 102 operating in an autonomous mode.

At step 704, EVE "handshakes" with aggregation server 106 to establish communication. In an exemplary embodiment, VL 103 handshakes with aggregation server 106 to set communication protocols and register its presence with aggregation server 106. This request is processed by the aggregation server. See, for example, flowchart 1100, step 1106 described below.

At step 706, EVE 102 sends EVE operational parameters to aggregation server 106. In an exemplary embodiment, VL 103 may send to the aggregation server EVE operational parameters, which include those calculated by VL 103, as well as those copied from EVE attributes and those copied from EVSE attributes.

At step 708, EVE 102 synchronizes its driving schedule, also referred to as "next trips predictions." In an exemplary embodiment, VL 103 and aggregation server 106 each maintain a driving schedule for the vehicle in which EVE 102 is located. The driving schedule may be a prediction of future trips, based on human inputs and, optionally, computer predictions. In an exemplary embodiment, the human inputs are time stamped when entered, and the driving schedules are synchronized such that in the event of a conflict between schedules on the EVE versus those on the aggregation server, human inputs override computer predictions and more recent human inputs override older inputs. In another exemplary embodiment not shown explicitly in step 708, if the aggregation server is not known and trusted, EVE 102 may restrict sending to a limited driving schedule, for example, only sending the next departure time to a parking operator's aggregator.

At step 710, EVE 102 optionally transmits saved data to aggregation server. In an exemplary embodiment, VL 103 checks for data stored while EVE 102 was operated in an autonomous mode, e.g., due to a previous communication failure with aggregation server 106, described below with reference to steps 726-736 of flow chart 700. Stored data may include charging or grid services performed previously, and stored in a log in memory 212 while VL 103 was not not in communication with aggregation server 106.

At step 712, EVE 102 determines its available capacity. In an exemplary embodiment, VL 103 determines available power capacity based on EVE operational parameters, in turn based on battery energy, battery headway, driving schedule, EVE attributes, and EVSE attributes. Driving schedule may affect available capacity in a number of ways. For example, if the vehicle is scheduled to be driven in less than one hour a distance that would require 75% of its battery energy, VL 103 may determine that less that the full power capacity is currently available or no capacity is currently available. In an exemplary embodiment, EVE 102 determines the effect on the battery of reaching and sustaining various levels of charge (e.g., based on battery manufacturer specifications) and bases available capacity calculations on charging the battery to a level just sufficient for the electric vehicle to carry out predicted trips determined fro the driving schedule, while minimizing wear on the battery, so as to prolong battery life.

At step 714, EVE 102 reports its available capacity to aggregation server 106. In an exemplary embodiment, VL 103 communicates available capacity to aggregation server 106.

At step 716, EVE 102 receives a dispatch signals from aggregation server 106. In an exemplary embodiment, VL 103 receives dispatch signals from aggregation server 106. The dispatch signals from aggregation server include requests for receiving or supplying power to the grid 108. As noted below with reference to flowchart 1300, steps 1304 and 1306, the aggregation server will not request power to or from vehicles at greater than their reported capacities.

At step 718, EVE 102 controls power flow between EVE 102 and the grid 108. In an exemplary embodiment, VL 103 controls the flow of power between EVE 102 and the grid 108 through EVSE 104 based on the dispatch signal processed at 716. The power flow may be to or from the grid 108.

At step 720, EVE 102 measures actual power flow. In an exemplary embodiment, VL 103 receives a power flow signal from PEM 204 indicating actual power flow between EVE 102 and the grid 108. In another embodiment, VL directly measures power using current sensor 220 and voltage from PME 204, combining the two to calculate power.

At step 722, EVE 102 reports the measured power flow. In an exemplary embodiment, VL 103 reports the measured power flow to the aggregation server 106.

At step 724, EVE 102 determines if response to dispatch should end. If no, processing proceeds at block 712 with an updated report on capacity or block 716 with receipt of another dispatch signal. If yes, processing ends. Processing may end, for example, if EVE determines that it should shift to charging only, if there is a disconnect between the EVE 102 and the aggregation server 106, the vehicle is unplugged, there is a loss in grid power, and/or a fault occurs.

If power flow is to continue, at step 725, VL 103 determines whether to adjust reported capacity in step 714. If reported capacity is to be adjusted, processing may continue at step 712 periodically, e.g., every 15 minutes, and/or in response to a discrepancy between the capacity specified in the dispatch signal and the actual power measurements in step 720. If reported capacity is not to be adjusted, processing may continue at step 716 periodically, e.g., every 5 minutes, and/or in response to an end time specified in the dispatch signal received at step 716.

At step 726, which is reached if EVE 102 is unable to establish communication with the aggregation server 106, EVE 102 enters an autonomous mode.

At step 728, EVE 102 sets control by aggregation server off and sets autonomous control on. In an exemplary embodiment, VL 103 toggles all aggregator-controlled grid services off and toggles on grid services based on local information, e.g., charging and provision of services based on local detection such as local frequency detect and reactive power, or simply off-peak charging.

At step 729, EVE 102 determines whether to charge and/or which local services to provide. In an exemplary embodiment, VL 103 decides to provide local grid services, based on EVE operational parameters, including EVSE attributes and driving schedule in VL memory 212 by sensing local grid conditions such as frequency, voltage or reactive power. In another exemplary embodiment, VL 103 may determine from EVE operational parameters in memory 212 to set charging current to zero and wait for off-peak electric rates, then charge up to the charge needed for the next trip beginning when those rates go into effect.

At step 730, EVE 102 controls power flow (e.g., charge or discharge). In an exemplary embodiment, VL 103 charges and discharges based on the determinations made at step 729.

At step 732, EVE 102 optionally provides local grid services. At step 734, EVE 102 logs power flow transactions. In an exemplary embodiment, VL 103 logs all power flow transactions and local grid services while EVE 102 is disconnected from aggregation server 106 for subsequent reporting when communication with aggregation server 106 is established or reestablished (see step 710).

At step 736, EVE 102 ends autonomous processing mode. In an exemplary embodiment, VL 103 ends autonomous processing in response to reestablishing connection to the aggregation server or unplugging EVE 102 from EVSE 104.

Figure 8:
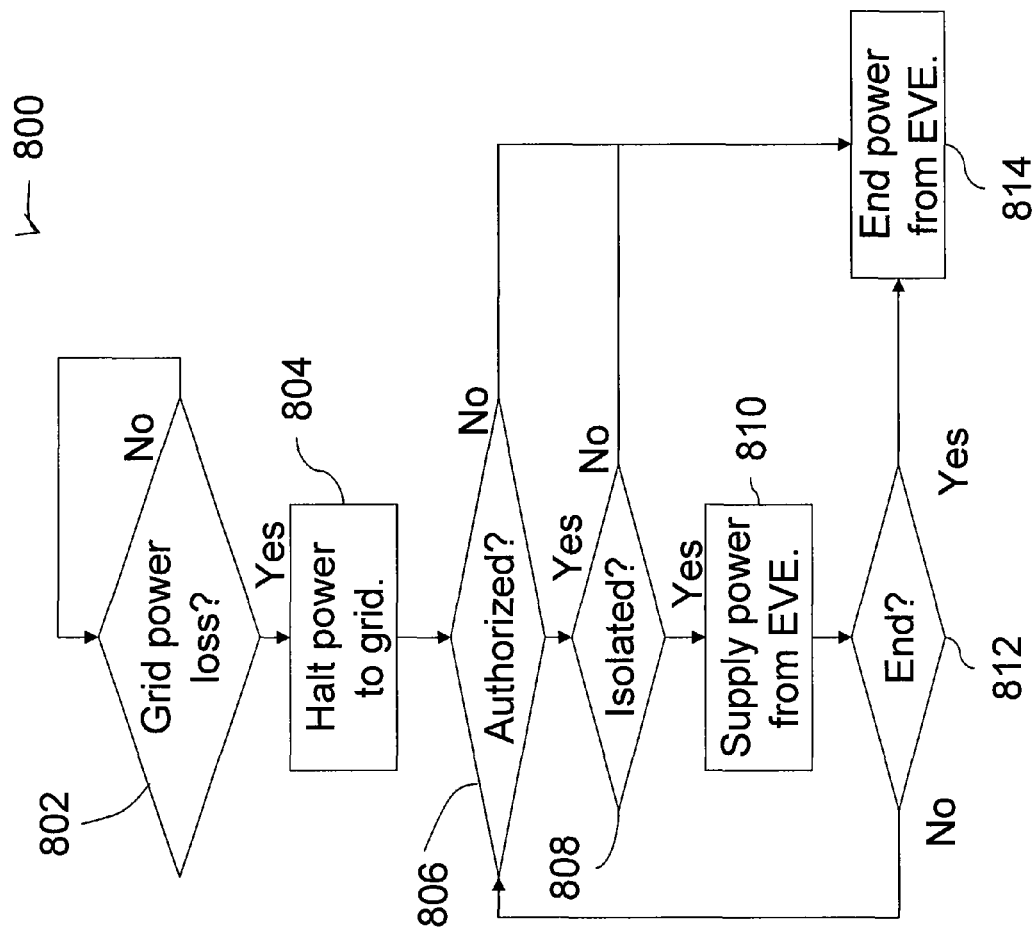
FIG. 8 is another flow chart depicting exemplary steps performed by electric vehicle equipment in accordance with an exemplary aspects of the present invention.

FIG. 8 is a flow chart 800 of exemplary steps for supplying power from EVE 102 in the event of a power outage.

At step 802, EVE 102 determines if there is grid power loss. In an exemplary embodiment, PEM 204 detects power loss in a conventional manner and VL 103 determines that there is grid power loss through communication with PEM 204. If there is grid power loss, processing proceeds at step 804. Otherwise VL 103 continues to periodically check for grid power loss, while performing the other processing steps of flowchart 700.

At step 804, EVE 102 halts power flow to the grid 108. In an exemplary embodiment, VL 103 immediately instructs PEM 104 to not deliver power (this is a typical anti-islanding provision). This is done prior to any other processing and in one exemplary embodiment may be performed at a lower level of hardware or by other means to insure fail safe cutoff.

At step 806, EVE 102 determines if EVSE 104 authorized it for use in the event of grid power loss, and if it has capabilities to do so. In an exemplary embodiment, VL 103 determines whether an EVSE attribute has been received indicating that EVSE 104 is authorized to receive power (e.g., has been approved by an electrician as having proper equipment installed) in the event of grid power loss. If EVSE 104 is authorized, processing proceeds at step 812. Otherwise, VL 103 discontinues supplying/will not supply power from EVE 102 to EVSE 104.

At step 808, EVE 102 determines if EVSE 104 is isolated from the grid 108. In an exemplary embodiment, VL 103 determines whether EVSE 104 is isolated based on a positive indication from EVSE 104 or from another device, e.g., a manual or automatic building isolation switch. If EVSE 104 is isolated, processing proceeds at step 810. Otherwise, VL 103 discontinues supplying, or will not supply, power from EVE 102 to EVSE 104. Existing electrical codes require an isolation switch to electrically isolate the building loads from the dead grid. These codes require such isolation from the grid 108 prior to starting an emergency generator to energize the building or load side. In an exemplary embodiment, EVSE 104 processes the required verification of isolation from the isolation switch, and signals EVE 102 that it should subsequently be the source of electric power generation.

A standard isolation switch, or a modified isolation switch, may be used to detect loss of grid power, to disconnect the building/house or load from the grid 108, and to signal that this isolation has been achieved via a wire labeled, for example, "start generator" connected to EVSE 104. EVSE 104 can be configured for emergency power use by setting a static EVSE attribute, e.g., "emergency power flag," indicating that a qualified electrician has confirmed that the isolation switch is installed correctly, that it is correctly connected to EVSE 104, and possibly that a center-tap transformer is provided as specified below. In addition, three dynamic attributes may be used to signal readiness to generate, e.g., (1) dynamic EVSE attribute indicating that the "start generator" or similar signal from the isolation switch is on, (2) dynamic EVSE attribute indicates that the center-tap transformer is connected by contactors, and (3) dynamic EVSE attribute indicates that the currently plugged-in vehicle is capable of this type of generation mode. As with other EVSE attributes, these static and dynamic attributes are transmitted to EVE 102. In one exemplary embodiment of the invention, EVE 102 will not instruct the vehicle to produce power unless these EVSE attributes are set correctly, and unless the attribute indicating that the isolation switch is working continues to be on. For single-phase, center-tap neutral electrical connections, a center-tap 240V inductor, rated at the same power rating as the maximum output of EVSE circuit, may be added to EVSE 104. The center tap 240V inductor may be normally disconnected from EVSE 104 via contactors or relays. When the grid-integrated vehicle is providing emergency power, the inductor may be connected across the 240 VAC from the vehicle. This configuration enables a vehicle which provides 240 volts, but without center-tap neutral, to feed into a center-tap neutral building electrical system. It will be understood by one skilled in the art from the description herein how a three-phase building may similarly use a corresponding transformer in Y or Delta configuration.

At step 810, EVE 102 provides power to EVSE 104. In an exemplary embodiment, VL 103 instructs PEM 204 to deliver power to EVSE 104, e.g., for powering house in the event of power failure, for example.

At step 812, EVE 102 determines if it should end supply of emergency power. In an exemplary embodiment, VL 103 determines EVE 102 should stop supplying emergency power when a fault is detected, grid power is detected, or battery charge falls below a threshold, e.g. below 15%. If EVE 102 determines it should continue to supply emergency power, processing proceeds at step 806.

At step 814, EVE 102 discontinues supplying power. In an exemplary embodiment, VL 103 instructs PEM 204 to discontinue supplying ,or to not supply, power from EVE 102 to EVSE 104. If the threshold was reached due to low battery, VL 103 may additionally shut down EVE 102 in order to preserve battery power.

Although embodiments of the invention are shown for controlling power to a grid-integrated vehicle, VL 103 may be used to control other devices with storage ability and with some predictability about the time that energy needs to be withdrawn from storage. For example, embodiments of the invention may be applied to storage space heaters or storage furnaces, which similarly have predictable use (in cold weather) and which may be charged up (with heat) by timing energy input in order to provide grid services. In such embodiments, the heat storage may be configured such that only one-way electrical power flow to the storage space heater is provided, not the extraction of electricity from the heat storage. EVE 102 operates as described in this invention, with adaptations such as setting to zero the parameter reverse flow limit, and instead of predicting battery capacity, timing and duration of trips, rather, EVE 102 predicts building or occupant needs for heat services such as space heat, cooling, hot water, or clean dishes. Other building electricity uses that involve energy storage, and thus potential management, such as chilling or water heating, may similarly be controlled by VL 103.

An exemplary algorithm for configuring VL 103 within EVE 102 to implement the steps described above with reference to FIGS. 6-8 is now provided.

Exemplary VL Algorithm

Figure 9:
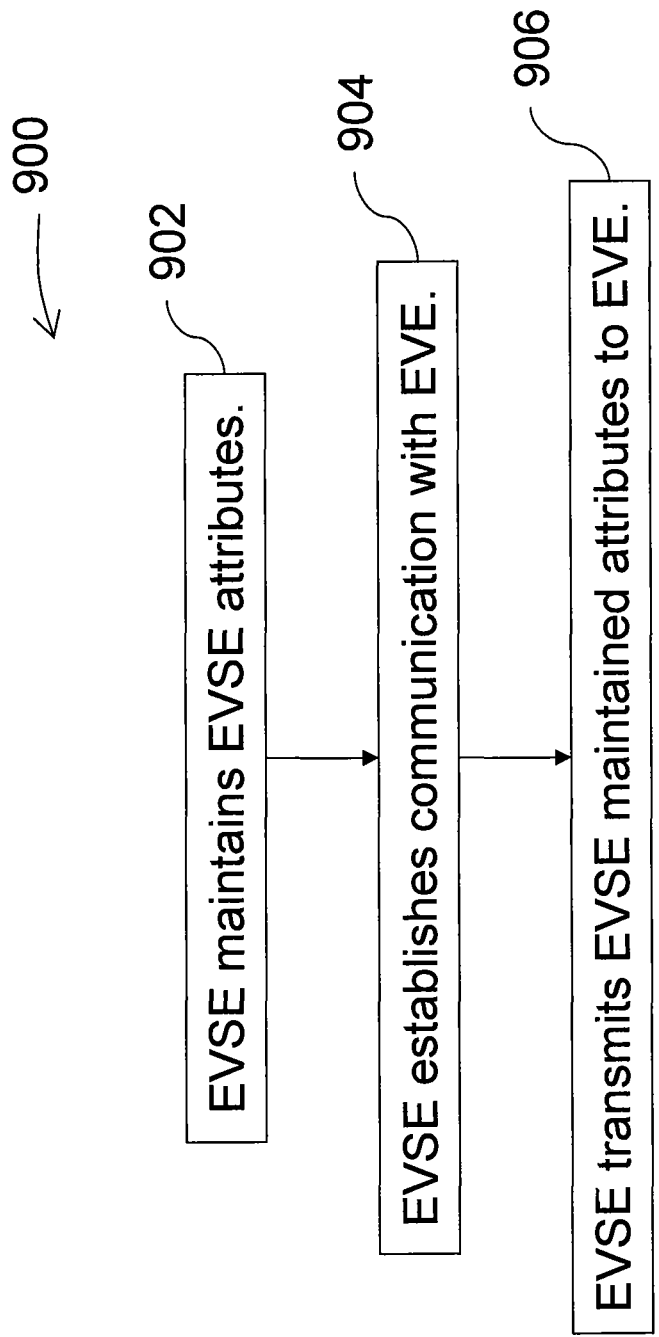
FIG. 9 is a flow chart depicting exemplary steps performed by electric vehicle station equipment in accordance with an exemplary aspects of the present invention.

Processing Invoked upon Plug-In of Vehicle to EVSE
    Receive EVSE power capacity via pilot signal
    IF EVSE communications,
        THEN get EVSE attributes, send vehicle attributes to EVSE
        ELSE use defaults for attributes
    Calculate charge and discharge power capacity in kW, based on EVSE power capacity, EVE power capacity, EVSE attributes, battery kWh and state of charge, driving schedule, etc
    IF grid location in EVSE attributes
        THEN process grid location from EVSE
        ELSE get GPS location and infer or approximate locational parameters
    IF electric account, electric charging vendor, etc available from EVSE
        THEN get account and authorizations
        ELSE make best inferences about account, marked as uncertain
    Process authorizations from EVSE including:
        Ok to charge, payment required/not, backfeeding allowed, action on loss of grid power, required aggregation server, local IP address
    IF EVSE requires local aggregator and driver has authorized substitution
        THEN attempt to communicate to local aggregation server
        ELSE attempt to use vehicle's normal aggregation server
    IF accomplished connection to any aggregator
        THEN
            connected mode (real-time command and reporting),
            If normal aggregator
                THEN Allow Private Data transfers ELSE restrict data transfers
    ELSE Autonomous mode (e.g. log data)
Connected Mode, when Connected to Aggregator
  Handshake with aggregation server
  If private data transfers allowed
    THEN Synchronize driving schedule on VL and aggregation server
  Transmit to aggregation server any saved data on prior charging or grid services while disconnected
  Determine power capacity available now based on driving schedule, EVE and EVSE attributes, etc.
  Report power capacity to aggregation server
  REPEAT
    Receive dispatch signal from aggregator
    Command VMS to charge or discharge battery
    Measure resulting power flow to/from grid
    Report power flow to aggregator
    Adjust reported power capacity based on prior n responses, battery state of charge, etc.
  UNTIL aggregator disconnected, vehicle unplugged, grid power loss, or fault Autonomous mode, plugged in to EVSE but not connected to aggregation server
  Enter autonomous mode
  Toggle off all automatic generation control (AGC) services
  Toggle on grid services based on local information, including Charging, provision of services based on local detect, e.g. local frequency detect and correct, reactive power
  REPEAT
    Charge/discharge based on time of day, driving schedule and services Provide local grid services as possible
    Log all transactions for subsequent reporting when reconnected
  UNTIL reconnect to aggregator or unplug from EVSE
Processing upon loss of grid power
  Stop any power flow from EVE to grid (anti-islanding protection)
  IF NOT local emergency power authorized
    THEN shutdown vehicle power
    ELSE
    REPEAT
      IF building isolation from grid confirmed
        THEN energize building from EVE
      UNTIL fault OR building not isolated OR
      grid power restored OR battery too low
End of VL Algorithm FIG. 9 is a flow chart 900 of exemplary steps taken by EVSE for managing power flow in accordance with aspects of the present invention.

At step 902, EVSE 104 maintains EVSE attributes. In an exemplary embodiment, maintaining EVSE attributes may include initialization of static EVSE attributes and digital signature by authorized personnel, and updating dynamic EVSE attributes by EVSE microprocessor 304.

At step 904, EVSE 104 establishes communication with EVE 102. In an exemplary embodiment, EVSE 104 establishes communication with VL 103 of EVE 102. At step 906, EVSE 104 transmits the maintained EVSE attributes to EVE 102. In an exemplary embodiment, EVSE 104 transmits EVSE attributes to VL 103 of EVE 102.

Figure 10:
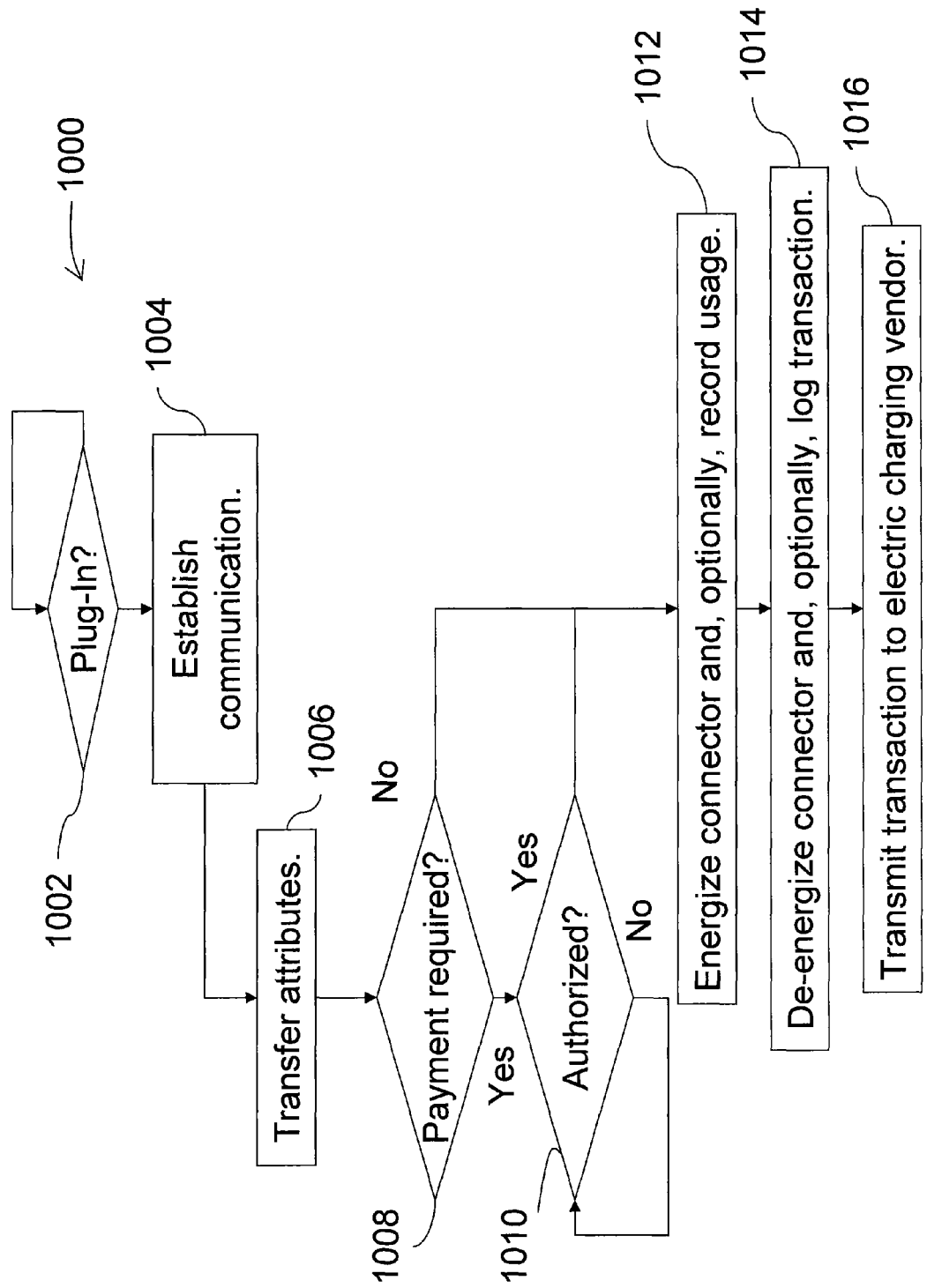
FIG. 10 is another flow chart depicting exemplary steps performed by electric vehicle station equipment in accordance with an exemplary aspects of the present invention.

FIG. 10 is a flow chart 1000 of exemplary steps for interfacing EVSE 104 with EVE 102 to manage power flow from the perspective of EVSE 104.

At step 1002, EVSE 104 detects a plug-in event. In an exemplary embodiment, EVSE 104 detects the presence of an EVE connector 250 by the corresponding connector 350 of EVSE 104, e.g., based on a plug-present signal generated by pin 350e. If plug-in is detected, processing proceeds to step 1004. Otherwise, EVSE 104 continues to wait for a plug-in event.

At step 1004, EVSE 104 establishes communication with EVE 102. In an exemplary embodiment, communication is established in accordance with one of the methods described above.

At step 1006, EVSE 104 transfers attributes. In an exemplary embodiment, microprocessor 304 retrieves EVSE attributes from memory 306 and transmits EVSE attributes to VL 103. Additionally, EVSE 104 receives EVE attributes from EVE 102 and stores them in EVSE memory 306.

At step 1008, EVSE 104 determines if payment is required. If payment is not required, processing proceeds at step 1012. If payment is required, processing proceeds at step 1010.

At step 1010, EVSE 104 determines if charging is authorized. If charging is authorized, e.g., in response to an account number lookup, a card swipe, coin deposit, etc., processing proceeds at step 1012. If charging is not authorized, EVSE 104 waits for authorization. In an exemplary embodiment, EVSE 104 may alert the user of the vehicle if authorization is not received, e.g., by sending a message to EVE 102 for display to the driver within the vehicle or displaying a message on a display (not shown) associated with the EVSE 104, and awaiting an alternative payment method.

At step 1012, EVSE 104 energizes the connector. In an exemplary embodiment, microprocessor 304 energizes connector 350 by closing contactor 302. Optionally, EVSE 104 records energy usage. In an exemplary embodiment, microprocessor 304 records usage during the period of time when contactor 302 is closed. Additionally, if grid services are being provided by vehicle for parking privileges, EVSE 104 may record this. EVSE may also optionally report periodically to an electric charging vendor.

At step 1014, EVSE 104 de-energizes the connector. In an exemplary embodiment, microprocessor 304 de-energizes connector 350 by opening contactor 302. Optionally, EVSE 104 logs the recorded usage. In an exemplary embodiment, microprocessor 304 logs the recorded usage in memory 306. EVSE 104 may calculate total power flow transactions, e.g., net energy use, duration parked, etc.

At step 1016, EVSE 104 transmits the recorded usage to an electric charging vendor. In an exemplary embodiment, microprocessor 304 retrieves the recorded usage from memory 306 and transmits to the electric charging vendor. Additionally, EVSE 104 may report disconnect and calculated total energy transaction information to electric charging operator and to parking operator.

An exemplary algorithm for configuring EVSE 104 to implement the steps described above with reference to FIG. 10 is now provided.

Figures 11, 12:
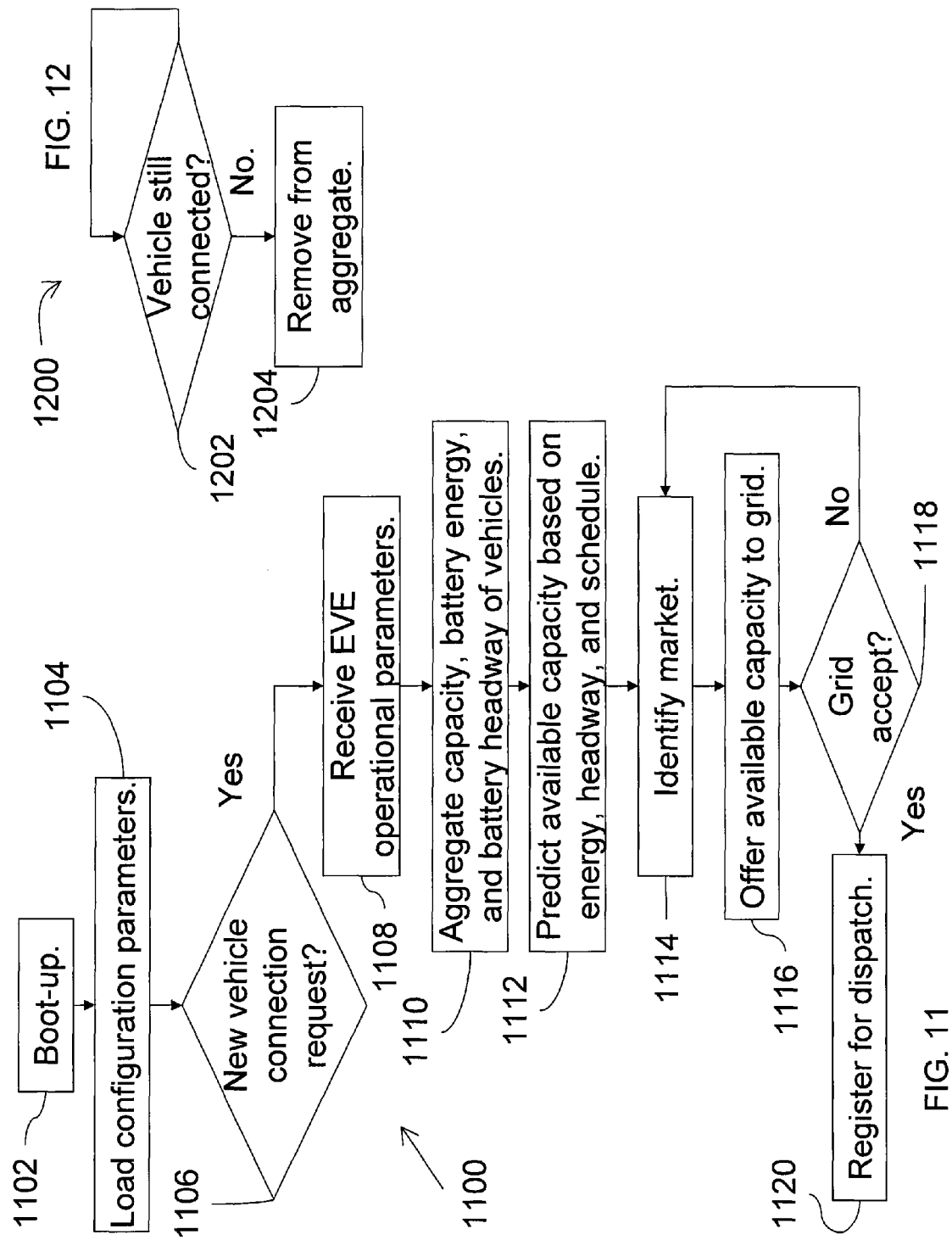
FIG. 11 is a flow chart depicting exemplary steps performed by an aggregation server in accordance with an aspect of the present invention.
FIG. 12 is another flow chart depicting exemplary steps performed by an aggregation server in accordance with an aspect of the present invention.

Exemplary EVSE Connection Algorithm
  In the exemplary embodiment, EVSE communicates with the vehicle with the following three-part algorithm. Plug-in and disconnect of vehicle are event-driven.
Upon Plugin of Vehicle
  IF communications on control wire (e.g. serial encoded, CAN-bus, or single-wire Ethernet)
    THEN send EVSE attributes to VL and receive EVE attributes
  IF payment not required
    THEN energize vehicle power
    ELSE Await authorization from vehicle, local action by driver (e.g. card swipe, coin deposit) or authorization from electric charging vendor
  IF authorized
    THEN energize vehicle power
    ELSE write message to driver and alert parking operator
Upon Successful Energizing of Vehicle
  Provide conduit for charging and/or grid services, as authorized
  If EVSE has metering
    THEN report periodically to electric charging vendor
  IF vehicle is providing grid services for parking
    THEN report periodically to parking operator
Upon Disconnect of Vehicle
  De-energize vehicle connector
  IF EVSE has metering, calculate total transaction:
    net energy use, duration parked, etc.
  If EVSE has communications capability
    THEN report disconnect and total transaction to electric charging vendor and to parking operator
  Wait for plugin of next vehicle
End of EVSE Algorithm FIG. 11 is a flow chart 1100 of exemplary steps for interfacing EVE 102 with aggregation server 106 to manage power flow from the perspective of aggregation server 106.

At step 1102, aggregation server 106 boots up and, at step 1104, aggregation server 106 loads configuration parameters. In an exemplary embodiment, aggregation server 106 loads from local storage DSO maps, a list of registered charge locations (DSO location and accounts) a list of VLs 103 registered (with accounts) and, for each registered VL 103, account number(s), and last known driving schedule, also called predicted next trips. Additionally, aggregation server may retrieve over the Internet from the TSO (name of grid service buyers, market rules, and signaling rules), DSO (updated DSO circuit and system maps, and switch states), and/or IPP (generator state, generators needing storage resources).

At step 1106, aggregation server 106 receives a connection request from a vehicle (i.e., a call-in request or a redial/reconnect request).

At step 1108, aggregation server 106 receives EVE operational parameters, including EVE attributes. In an exemplary embodiment, aggregation server 106 receives EVE operational parameters from VL 103. In an exemplary embodiment, EVE attributes include unique EVE ID, unique EVSE ID, and all operational parameters calculated in EVE algorithm steps 618 and 628.

At step 1110, aggregation server 106 aggregates one or more of EVE attributes and EVE operational parameters. In an exemplary embodiment, aggregation server 106 aggregates power capacity, battery energy, battery headway, and driving schedule information.

At step 1112, aggregation server 106 predicts total available capacity from an aggregate of one or more connected EVEs. In an exemplary embodiment, aggregation server 106 predicts total available capacity based on energy, headway, and schedule of each connected EVE. In an exemplary embodiment, aggregation server 106 identifies EVEs 102 that are likely to be available in particular blocks of time, e.g., 6 minutes, 10 minutes, 15 minutes, an hour, two hours, etc. Aggregation server 106 may elect to not use vehicle who are scheduled to be disconnected from the grid 108 shortly after the scheduled block, e.g., if the vehicle is scheduled for a trip on Monday at 2:10 pm. For future time blocks, aggregation server 108 may also include capacity of vehicles predicted to be available, based on driving schedule, even if not connected at the time step 1112 is performed. The aggregation server 106 then sums capacities from the vehicles that are available during each block of time. For example, the aggregation server 106 may sum capacities such as power, battery charge, and battery headway from each vehicle available based on calendar information during a particular period of time, e.g., Monday between 2 and 3 pm. For example, if there are 1,200 vehicles and 1,000 of them are predicted to be available between 2 and 3 pm on Monday and each vehicle is capable, on average, of delivering 10 kW during that period of time, the total predicted power capacity would be 10 MW. The aggregation server 106 may additionally reduce the total capacity by a certain percentage, e.g., 15%, to achieve a reliable power capacity offering while accounting for vehicles that may be disconnected during a block of time when their schedule indicates they are available (i.e., unplanned and unpredicted trips). For example, the total capacity of 10 MW may be reduced to 8.5 MW as the reported total available capacity. The percentage adjustment may be determined based on the aggregation server's historical ability to provide capacity to the grid and the amount of penalty for failing to provide offered capacity. For example, if the total available capacity is delivered 99.9 percent of the time when dispatched, the reduction percentage may be decreased (e.g., to 10 percent). On the other hand, if the total available capacity fails to be delivered 10 percent of the time when dispatched, the reduction percentage may be increased (e.g., to 25 percent).

At step 1114, aggregation server identifies a market for the predicted total available capacity. In an exemplary embodiment, aggregation server 106 (or an operator thereof) analyzes available market information to determine the highest price available for grid services capable of being filled using the aggregated EVE capacities for each block of time.

At step 1116, aggregation server 106 offers the total available capacity to one or more identified markets.

At step 1118, aggregation server 106 determines if the offered total available capacity was accepted by the grid 108. If the grid 108 accepts the offer, processing proceeds at step 1120 with the registration of the offered total available capacity with the grid 108 for dispatch. Processing by the aggregation server may then proceed in accordance with the steps of flowchart 1300 described with reference to FIG. 13. If the grid does not accept the offer, processing returns to step 1114 to identify another market.

FIG. 12 depicts a flow chart 1200 of exemplary steps for removing an EVE 102 from the grid 108 from the perspective of aggregation server 106.

At step 1202, aggregation server 106 determines if the vehicle is still connected. In an exemplary embodiment, aggregation server 106 determines that the vehicle is disconnected when communication is lost with VL 103 or when no communications have been received for a threshold period of time. If the vehicle is no longer connected, processing proceeds at step 1204. Otherwise, aggregation server waits from the vehicle to be disconnected while continuing processing in accordance with the steps of flowcharts 1100 and 1300.

At step 1204, aggregation server 106 removes the vehicle from the aggregation calculation in step 1110 (FIG. 11).

Figure 13:
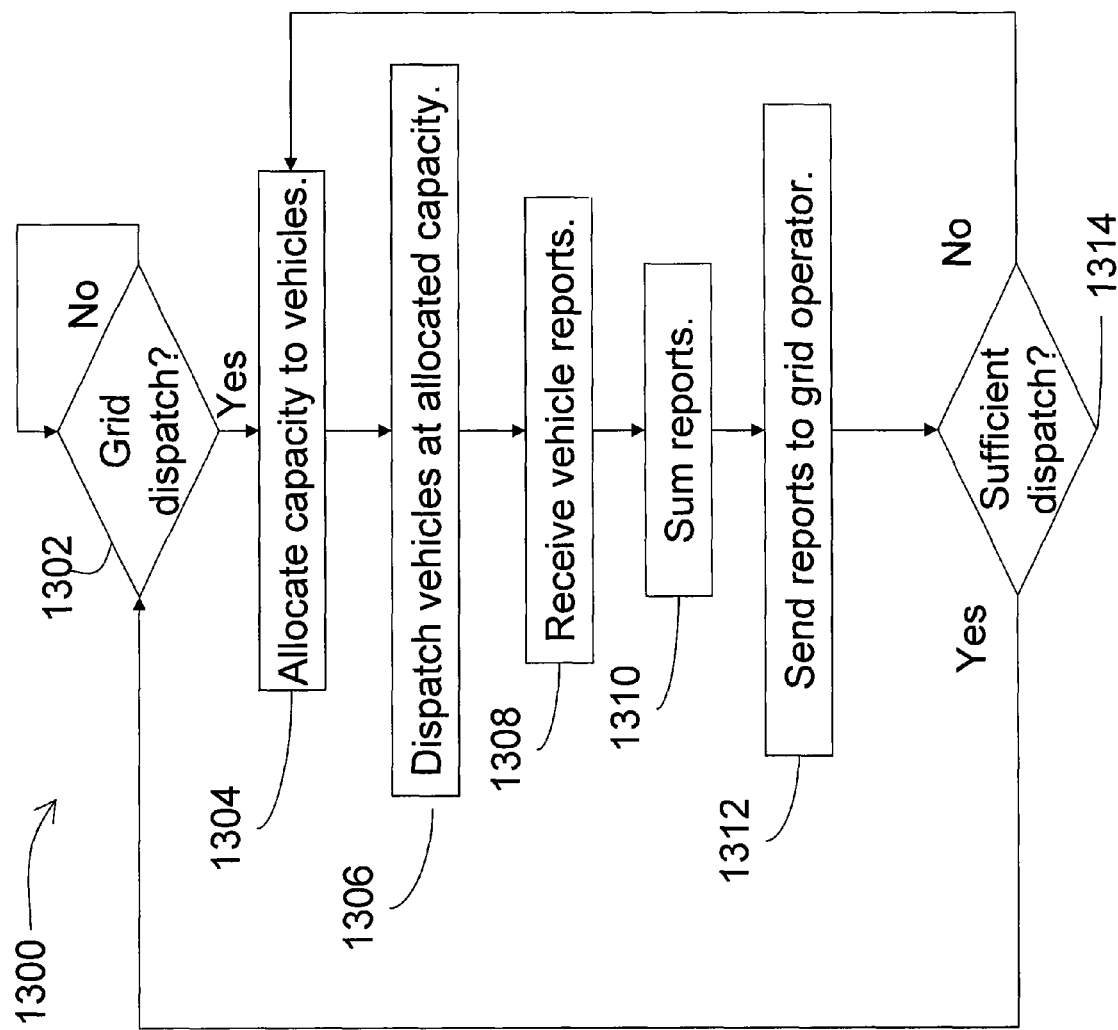
FIG. 13 is another flow chart depicting exemplary steps performed by an aggregation server in accordance with an aspect of the present invention.

FIG. 13 is a flow chart 1300 of exemplary steps for dispatching vehicle total available capacity from the perspective of aggregation server 106.

At step 1302, aggregation server 106 determines if the grid 108 has issued a dispatch signal. In an exemplary embodiment, the grid dispatch signal is received from TSO, DSO, or IPP. If the grid 108 has issued a dispatch signal, processing proceeds at step 1304. Otherwise, aggregation server waits for a dispatch signal.

At step 1304, aggregation server 106 allocates capacity to be dispatched, among the connected vehicles. For example, if the dispatch signal from the grid 108 is requiring 10,000 Watts and there are 20 cars that have indicated that they can each supply 1,000 Watts, the aggregation server may allocate 500 Watts to each of the connected vehicles. In more complete exemplary embodiments, allocation may be based on other EVE attributes and operational parameters, including driving schedule and grid location.

At step 1306, aggregation server 106 dispatches the vehicles at each vehicle's allocated capacity. In an exemplary embodiment, aggregation server 106 issues dispatch commands to VLs 103 in accordance with allocated capacities.

At step 1308, aggregation server 106 received reports from the vehicles. The vehicle reports may include actual Watts delivered, for example. If the actual Watts delivered are below the allocated amount, the aggregation server may attempt to reallocate among vehicles in step 1304.

At step 1310, aggregation server 106 sums the reports received in step 1308 and, in step 1312, sends the reports to the grid 108, e.g., the grid operator, such as TSO/, DSO or IPP, that issued the dispatch request.

At step 1314, aggregation server 106 determines if the aggregated power delivered is sufficient to meet the dispatch request. In an exemplary embodiment, aggregation server compares the total capacity allocated to the actual capacity identified in the reports. If the dispatch is sufficient, processing proceeds to step 1302 for the next dispatch. If the dispatch is not sufficient, processing proceeds at block 1304 with the aggregation server 106 attempting to reallocated the available capacity to meet the dispatched amount from the grid 108. Over a longer time frame, e.g., 15 minutes to one hour according to market rules, insufficient dispatch as determined in step 1314 will lead to a reduction in capacity offered to grid in step 1116.

An exemplary algorithm for configuring aggregation server 106 to implement the steps described above with reference to FIGS. 11-13 is now provided.

Exemplary Algorithm for an Aggregator of Grid-Integrated Vehicles

The top level description of the aggregation server consists of server startup (boot), and three distinct operational loops. Each operational loop gives the approximate timing in parenthesis. The three loops need not be exclusive, for example, they may run concurrently with appropriate semaphores.

Server Startup (upon Bootup or New Program Load)
   Load from secondary storage (e.g. from its hard disk):
      DSO maps
      List of registered charge locations, with DSO location and accounts
      List of VLs registered, with accounts
      For each VL, account number(s), and last known driving schedule
   Connect externally via internet, and load the following:
      TSO: Name of grid service buyers, and market/signaling rules.
      DSO: Updated DSO circuit and system maps, and switch states
      IPP: Generator state, generators needing storage resources
Loops to Register and Deregister Vehicles/VLs (Event Driven)
   Upon VL call-in to aggregation server, or redial/reconnect
      Receive and locally store VL oerational parameters:
         Car ID, EVSE ID, grid location, power capacity, battery energy (size and current charge state), predicted next use, range buffer, etc.
      Calculate time available for grid services
      Calculate power capacity this VL can offer, estimate how long
      Include this VL in server's aggregated capacity
   Upon loss of connection from a VL that was previously connected
      Remove car's capacity from server's aggregated capacity
Loop to Plan and Offer Capacity (e.g., Hourly Loop)
   Update vehicle capacity calculations
   Aggregate capacity of all vehicles, per area
   Run predictions, calculate firm capacity during next hour or target period
   Evaluate alternative potential markets
   Determine optimum market, or optimum number (n) of markets
   Offer capacity to market(s)
   IF offer(s) accepted,
      THEN Register accepted offer for dispatch
   Return to top of Loop "to plan and offer capacity"
Loop for Dispatch (e.g. one Second Loop)
   Wait for dispatch signal from TSO, DSO, or IPP
      Upon dispatch signal from TSO/DSO/IPP
         Allocate response among vehicles, considering all of:
            Time of next trip
            Margin for error based on historical experience and evaluation algorithm
            Allocation of responses may be may be regional or local, e.g., in correct TSO, local pricing node, substation, or distribution feeder
      Dispatch power via command to each allocated VL
      Receive report from each VL in allocation list
      Sum reports from VLs, by region and local grid locations
      Update registered capacity if responses not equal claimed capacity
      Send report on aggregated power delivered to TSO, DSO and/or IPP
   Go back to "Wait for dispatch signal"
   Note: One variant of the loop for dispatch is arbitrage, including night charging. In this variant, the dispatch is by price, timing may not be critical, and reports may be optional or delayed to the end of accounting or billing period.
End of Aggregation Algorithm Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for transferring power and information between a power grid and an electric vehicle, the method comprising:

maintaining, by an electric vehicle station equipment (EVSE) separate from the electric vehicle and electrically coupled to the power grid, EVSE attributes;

establishing, by the EVSE, communication with an electric vehicle equipment (EVE) inside the electric vehicle;

transmitting, by the EVSE, the EVSE attributes to the EVE, the EVSE attributes including authorization to backfeed power to the power grid;

receiving, by the EVSE, an instruction from the EVE, the instruction automatically generated by the EVE based on the EVSE attributes, the instruction including a communication to backfeed the power to the power grid; and energizing, by the EVSE, an electrical connector of the EVSE to electrically couple or decouple a corresponding electrical connector of the EVE with the power grid to supply power between the electric vehicle and the power grid in accordance with the instruction.

2. The method of claim 1, further comprising:
receiving EVE attributes from the EVE.

3. The method of claim 2, further comprising:
energizing a contactor positioned between the EVE and the power grid.

4. The method of claim 3, further comprising:
determining if payment is required;
wherein the energizing step energizes the contactor if the payment is not required.

5. The method of claim 4, further comprising:
determining if the payment has been authorized; and
wherein the energizing step energizes the contactor if the payment is required and the payment is authorized.

6. The method of claim 1, further comprising:
recording usage of the EVE by the EVSE; and
transmitting the recorded usage to an electric charging vendor.

7. The method of claim 1, further comprising:
an agent entering the EVSE attributes into the EVSE along with authorization codes to restrict or enable specific electrical services to or from the electric vehicle, those restrictions including electrical limits, only at approved sites, only by approved vehicles, only when authorized via employee ID and a digital signature to provide tamper-resistance, the digital signature indicating that the agent is authorized.

8. The method of claim 1:
wherein the EVSE attributes transmitted, by the EVSE, includes power charging capabilities of the EVSE;
wherein the instruction received, by the EVSE, from the EVE, is generated based on the power charging capabilities of the EVSE; and
wherein the electrical connector is energized, by the EVSE, for a specified time, at a specified rate and in a specified direction in accordance with the instruction.

9. A system for transferring power between a power grid and an electric vehicle, the system comprising:
electric vehicle station equipment (EVSE) separate from the electric vehicle and electrically coupled to the power grid, and including EVSE attributes; the EVSE configured to:
establish communication with an electric vehicle equipment (EVE) inside the electric vehicle;
transmit the EVSE attributes to the EVE;
receive an instruction from the EVE, the instruction automatically generated by the EVE based on the EVSE attributes; and
energize an electrical connector of the EVSE to electrically couple or decouple a corresponding electrical connector of the EVE with the power grid to supply power between the electric vehicle and the power grid in accordance with the instruction,
wherein the EVSE attributes transmitted, by the EVSE, includes power charging capabilities of the EVSE;
wherein the instruction received, by the EVSE, from the EVE, is generated based on the power charging capabilities of the EVSE; and
wherein the electrical connector is energized, by the EVSE, for a specified time, at a specified rate and in a specified direction in accordance with the instruction.

10. The system of claim 9, wherein the EVSE is further configured to:
receive EVE attributes directly from the EVE.

11. The system of claim 10, wherein the EVSE is further configured to:
energize a contactor positioned between the EVE and the power grid.

12. The system of claim 11, wherein the EVSE is further configured to:
determine if payment is required;
wherein the EVSE energizes the contactor if the payment is not required.

13. The system of claim 12, wherein the EVSE is further configured to:
determine if the payment has been authorized; and
wherein the EVSE energizes the contactor if the payment is required and the payment is authorized.

14. The system of claim 9, wherein the EVSE is further configured to:
record usage of the EVSE by the EVE; and
transmit the recorded usage to an electric charging vendor.

15. The system of claim 9, wherein the EVSE is further configured to:
enter EVSE attributes along with authorization codes to restrict or enable specific electrical services only by approved vehicles, only when authorized via employee ID and encryption to provide tamper-resistance.

16. An electric vehicle station equipment (EVSE) electrically coupled to a power grid for transferring power between the power grid and an electric vehicle equipment (EVE) of an electric vehicle, the EVSE comprising:
at least one vehicle communication port separate from the electric vehicle for interfacing with the EVE inside the electric vehicle;
an electrical connector separate from the electric vehicle for electrically coupling or decoupling the electric vehicle to the power grid;
a processor separate from the electric vehicle and coupled to the at least one vehicle communication port, the processor configured to:
establish communication with the EVE via the at least one communication port,
receive EVE attributes from the EVE,
transmit EVSE attributes to the EVE, the EVSE attributes including authorization to backfeed power to the power grid,
receive an instruction from the EVE, the instruction automatically generated by the EVE based on the EVSE attributes, the instruction including a communication to backfeed the power to the power grid, and
energize the electrical connector to electrically couple or decouple a corresponding electrical connector of the EVE with the power grid to supply power between the electric vehicle and the power grid in accordance with the instruction.

17. The apparatus of claim 16, further comprising a memory coupled to the processor, the processor configured to store and maintain the EVSE attributes in the memory.

18. The apparatus of claim 16, further comprising:
a contactor operably coupled to the processor, the contactor having a first side coupled to the at least one vehicle communication port and a second side for coupling to the power grid;

wherein the processor is further configured to operate the contactor to energize the electrical connector in accordance with the operational parameters.

19. The apparatus of claim 18, wherein the processor is configured to determine if payment is required and to energize the connector if the payment is not required.

20. The apparatus of claim 19, wherein the processor is further configured to determine if payment has been authorized and to energize the connector if the payment is required and the payment is authorized.

21. The apparatus of claim 16, wherein the processor is further configured to record usage of the EVSE by the EVE and to transmit the recorded usage to an electric charging vendor.

22. The apparatus of claim 16, further comprising:
   a transformer to match single-phase power received from the EVE to split-phase loads of a building when activated by the EVSE for emergency power; and
   at least one contactor connected to the processor, the at least one contactor positioned to couple the received power to the building in response to a signal from the processor.

23. The method of claim 1:
   wherein the EVSE attributes transmitted, by the EVSE, includes power charging capabilities of the EVSE;
   wherein the instruction received, by the EVSE, from the EVE, is generated based on the power charging capabilities of the EVSE; and
   wherein the electrical connector is energized, by the EVSE, for a specified time, at a specified rate and in a specified direction in accordance with the instruction.

* * * * *